(12) United States Patent
Saito et al.

(10) Patent No.: US 11,798,743 B2
(45) Date of Patent: Oct. 24, 2023

(54) ELECTRONIC DEVICE

(71) Applicant: TDK CORPORATION, Tokyo (JP)

(72) Inventors: Shinya Saito, Tokyo (JP); Kenya Tamaki, Tokyo (JP); Norihisa Ando, Tokyo (JP); Shinya Ito, Tokyo (JP); Akihiro Masuda, Tokyo (JP); Kosuke Yazawa, Tokyo (JP); Yoshiki Satou, Tokyo (JP); Katsumi Kobayashi, Tokyo (JP); Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/229,393

(22) Filed: Apr. 13, 2021

(65) Prior Publication Data

US 2021/0375547 A1    Dec. 2, 2021

(30) Foreign Application Priority Data

May 28, 2020  (JP) .................................. 2020-093568

(51) Int. Cl.
| | |
|---|---|
| *H01H 85/175* | (2006.01) |
| *H01G 4/224* | (2006.01) |
| *H01G 4/232* | (2006.01) |
| *H01G 2/06* | (2006.01) |
| *H01H 85/08* | (2006.01) |
| *H01G 4/38* | (2006.01) |

(52) U.S. Cl.
CPC .............. *H01G 4/224* (2013.01); *H01G 2/065* (2013.01); *H01G 4/232* (2013.01); *H01G 4/38* (2013.01); *H01H 85/08* (2013.01); *H01H 85/175* (2013.01)

(58) Field of Classification Search
CPC ...... H01H 85/08; H01H 85/175; H01G 2/065; H01G 4/224; H01G 4/232; H01G 4/38
See application file for complete search history.

(56) References Cited

U.S. PATENT DOCUMENTS

| | | | | |
|---|---|---|---|---|
| 4,644,316 A | * | 2/1987 | Takeuchi | ............ G05D 23/2401 219/544 |
| 5,621,602 A | * | 4/1997 | Winkelmann | ........ H01H 85/048 337/184 |
| 6,188,566 B1 | * | 2/2001 | Aoyama | .............. H01G 9/0003 361/275.4 |

(Continued)

FOREIGN PATENT DOCUMENTS

| | | |
|---|---|---|
| JP | S57-95612 A | 6/1982 |
| JP | S63-13219 U | 1/1988 |

(Continued)

OTHER PUBLICATIONS

Aug. 15, 2023 Office Action issued in Japanese Patent Application No. 2020-093568.

*Primary Examiner* — Jacob R Crum
(74) *Attorney, Agent, or Firm* — Oliff PLC

(57) ABSTRACT

An electronic device includes chip components, a case, conductive terminals, and a fuse. The chip components each include a terminal electrode. The case includes accommodation recesses for accommodating the chip components. The conductive terminals are fixed to the case and respectively connected to the terminal electrodes of the chip components. The fuse electrically connects the chip components.

24 Claims, 19 Drawing Sheets

(56) References Cited

U.S. PATENT DOCUMENTS

| | | | |
|---|---|---|---|
| 2006/0267719 A1* | 11/2006 | Yasuda | H01F 27/027 336/223 |
| 2010/0156589 A1* | 6/2010 | Kuo | H01C 17/02 338/226 |
| 2013/0141850 A1* | 6/2013 | Honda | H01G 11/10 361/679.01 |
| 2014/0240081 A1 | 8/2014 | Murowaki et al. | |
| 2015/0262775 A1* | 9/2015 | Kang | H01H 37/761 337/414 |
| 2015/0325370 A1* | 11/2015 | Lee | H01G 4/30 361/275.3 |
| 2016/0027582 A1* | 1/2016 | Ahn | H01G 4/232 174/260 |
| 2016/0211078 A1* | 7/2016 | Park | H01G 4/38 |
| 2016/0351333 A1 | 12/2016 | Ando et al. | |
| 2017/0086297 A1* | 3/2017 | Sakamoto | H05K 1/181 |
| 2018/0047539 A1* | 2/2018 | Kang | H01H 85/048 |
| 2019/0027282 A1* | 1/2019 | Sun | H01H 85/0241 |
| 2019/0200457 A1 | 6/2019 | Burk et al. | |
| 2020/0098521 A1* | 3/2020 | Ito | H01G 4/38 |
| 2021/0090838 A1* | 3/2021 | Kang | H01H 85/165 |

FOREIGN PATENT DOCUMENTS

| | | |
|---|---|---|
| JP | 2010-157410 A | 7/2010 |
| JP | 2011-040684 A | 2/2011 |
| JP | 2014-165480 A | 9/2014 |
| JP | 2015-122311 A | 7/2015 |
| JP | 2016-225369 A | 12/2016 |

\* cited by examiner

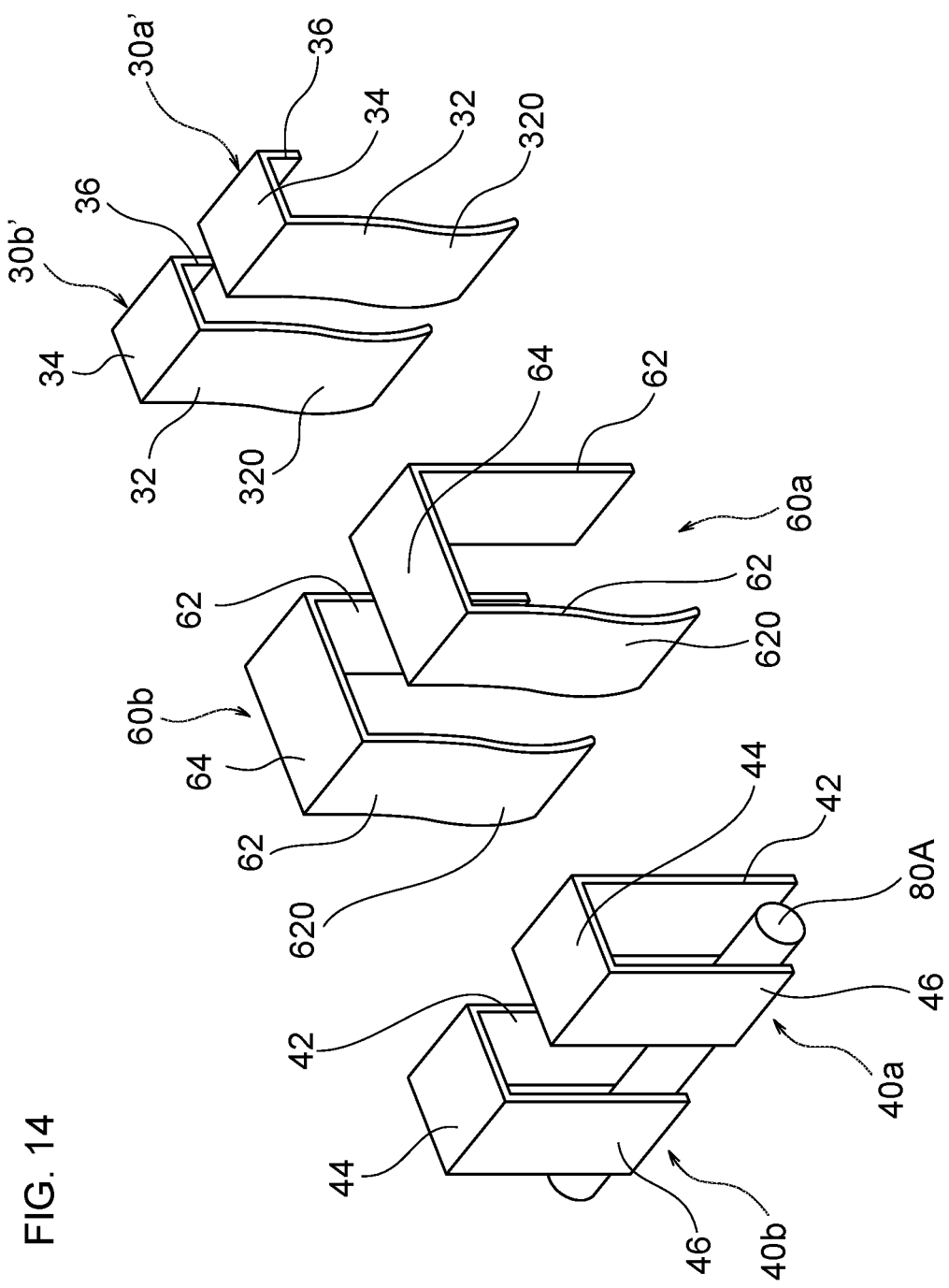

ELECTRONIC DEVICE

BACKGROUND OF THE INVENTION

The present invention relates to an electronic device including a case for accommodating a chip component, such as a multilayer ceramic capacitor.

As electronic devices such as multilayer ceramic capacitors, in addition to normal chip components that are directly surface-mounted or so alone on a board or so, an electronic device in which metal caps (metal terminals) are attached to a plurality of chip components is known as shown in, for example, Patent Document 1.

It is reported that the electronic devices on which the metal terminals are attached have effects of reducing a deformation stress from which the chip components receive from the board and protecting the chip components from impact or so. Then, the electronic devices on which the metal terminals are attached are used in fields requiring durability, reliability, and the like.

In this type of electronic devices, if the chip components have a short circuit failure due to breakdown or so, an overcurrent may flow between the terminal electrodes, and the board or so may be damaged due to heat. In conventional electronic devices, however, it cannot be said that sufficient safety measures have been taken, and there is room for improvement.

Patent Document 1: JP2011040684 (A)

BRIEF SUMMARY OF INVENTION

The present invention has been achieved under such circumstances. It is an object of the invention to provide an electronic device having a high safety.

To achieve the above object, an electronic device according to a first aspect of the present invention comprises:
  chip components each including a terminal electrode;
  a case including accommodation recesses for accommodating the chip components;
  conductive terminals fixed to the case and respectively connected to the terminal electrodes of the chip components; and
  a fuse electrically connecting the chip components.

The electronic device according to the first aspect of the present invention includes a case including accommodation recesses for accommodating the chip components. When the chip components are accommodated into the accommodation recesses, various types of circuits, such as a series circuit consisting of a plurality of chip components connected in series and a parallel circuit consisting of a plurality of chip components connected in parallel, can be obtained with one electronic device, and an electronic device with various functions can be obtained. When this electronic device is mounted on a board, a plurality of chip components can be connected to an external circuit altogether, and the mounting is easier than when a plurality of chip components is individually mounted on a board. When the chip components are accommodated into the accommodation recesses, the chip components can be protected effectively from impact or so.

The electronic device according to the first aspect of the present invention includes a fuse for electrically connecting the chip components. Thus, when an overcurrent flows through any of the chip components due to breakdown or so, the fuse connected to this chip component is electrically cut (fused), the electrical connection between the chip components via the fuse is released, and the overcurrent does not flow through the other chip components. Thus, the other chip components can be protected from damage, and a board or so can be prevented from being damaged due to heat generated by the overcurrent. Thus, the electronic device according to the first aspect of the present invention can have a high safety.

When the fuse is a commercially available one, in a case where the fuse is damaged, the above-mentioned functions can be exhibited again by simply replacing the damaged fuse with a new fuse, and the electronic device can have a high cost performance.

The fuse may connect the chip components via any of the conductive terminals. In this structure, the chip components can be connected in serried via the fuse. Thus, if any of the chip components has a short circuit failure, this influence can effectively be prevented from reaching the other chip components. In addition, the electronic device with the fuse can be obtained via an easy step of, for example, simply attaching the fuse onto a part of the conductive terminals exposed to the outside of the case, and the manufacturing process can be simplified.

The fuse may directly connect the chip components. In this structure, the fuse itself can be used instead of the conductive terminals, and the structure of the electronic device can be simplified. In addition, the chip components can be connected in serried via the fuse. Thus, if any of the chip components has a short circuit failure, this influence can effectively be prevented from reaching the other chip components.

The case may include a fuse hole with a concave shape for accommodating the fuse. In this structure, the fuse can be fixed to the case by simply accommodating the fuse into the fuse hole. When the fuse is accommodated in the fuse hole, the fuse can be protected from external factors, such as external force.

Preferably, the fuse hole is formed on an open edge surface around open surfaces of the accommodation recesses and straddles one of the accommodation recesses and the other one of the accommodation recesses next to each other. In this structure, when the fuse is accommodated into the fuse hole, the fuse is disposed near the terminal electrodes of the chip components accommodated in the accommodation recesses and is formed over the terminal electrodes. Thus, the terminal electrodes of the chip components can easily electrically be connected via the fuse.

The fuse hole may be formed on a side of the case and straddles regions each including one of the accommodation recesses and the other one of the accommodation recesses formed next to each other. When the fuse hole is formed on the side of the case, the fuse can be fixed to the side of the case and can be prevented from contacting with a board or so at the time of mounting the electronic device on the board with the upper or lower surface of the case as a mounting surface.

When the fuse hole is formed over regions of the accommodation recesses next to each other, the fuse is disposed to straddle the terminal electrode of the chip component accommodated in one accommodation recess and the terminal electrode of the chip component accommodated in the other accommodation recess. Thus, the terminal electrodes of the chip components can easily electrically be connected via the fuse.

Preferably, the fuse has a bar shape. In this structure, the fuse can easily be disposed over regions of the accommodation recesses next to each other, and the terminal electrodes of the chip components can easily electrically be connected via the fuse.

Preferably, the fuse is pushed by an elastic force of any of the conductive terminals and is thereby fixed inside the fuse hole. In this structure, the fuse can firmly be fixed inside the fuse hole and can be prevented from falling off.

The fuse may be fixed on a surface of the case. In this structure, the electronic device with the fuse can be obtained via an easy step of simply attaching the fuse onto the surface of the case, and the manufacturing process can be simplified.

Preferably, the fuse is at least partly disposed between the conductive terminals. In this structure, the conductive terminals can easily electrically be connected via the fuse.

The fuse may have a chip shape. In this structure, the fuse can easily be connected to the conductive terminals or the terminal electrodes of the chip components.

The electronic device further comprises a joint portion for jointing a plurality of the cases. A combined body of a plurality of electronic devices can be formed by jointing the cases via the joint portion. Thus, in addition to being able to handle a plurality of electronic devices as a unit, the user can optimize the configuration to a user-friendly form by making arrangements, such as increasing or decreasing the number of jointed cases according to the usage situation.

To achieve the above object, an electronic device according to a second aspect of the present invention comprises:
  a chip component including a terminal electrode;
  a case including accommodation recesses for accommodating the chip component;
  a conductive terminal fixed to the case and connected to the terminal electrode of the chip component; and
  a fuse electrically connected to the chip component.

The electronic device according to the second aspect of the present invention includes a fuse electrically connected to the chip component. Thus, when an overcurrent flows through the chip component due to breakdown or so, the fuse connected to this chip component is electrically cut (fused), the electrical connection between this chip component and an electric circuit connected to the tip of the fuse is released, and the overcurrent does not flow through this electric circuit. Thus, this electric circuit can be protected from damage, and a board or so can be prevented from being damaged due to heat generated by the overcurrent. Thus, the electronic device according to the second aspect of the present invention can have a high safety.

BRIEF DESCRIPTION OF DRAWINGS

FIG. 14 is a perspective view illustrating conductive terminals and a fuse shown in FIG. 12.

DETAILED DESCRIPTION OF INVENTION

Hereinafter, the present invention is explained based on embodiments shown in the figures.

First Embodiment

Figure 1:
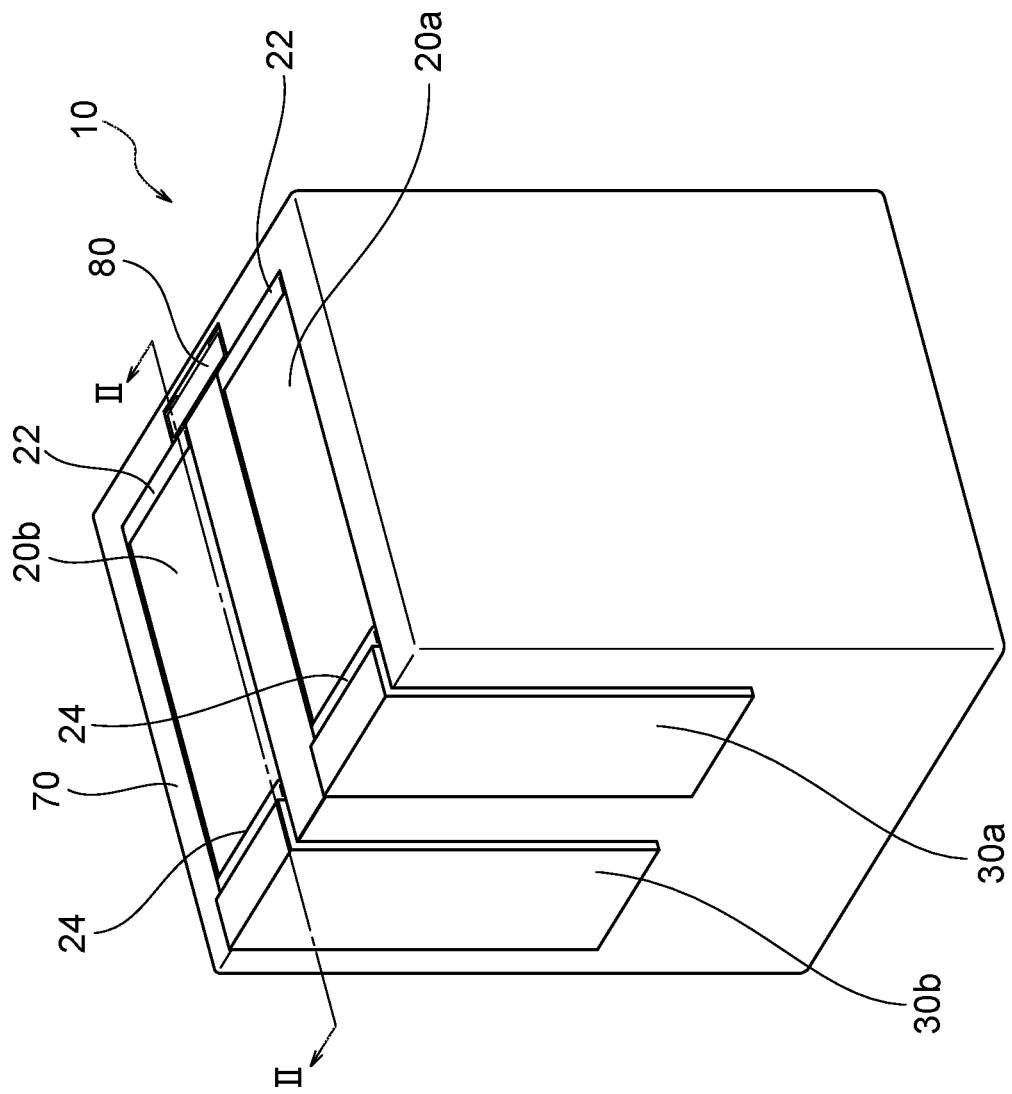
FIG. 1 is a perspective view of an electronic device according to First Embodiment of the present invention.

As shown in FIG. 1, an electronic device 10 according to First Embodiment of the present invention includes two capacitors (chip components) 20a and 20b, a pair of conductive terminals 30a and 30b, an insulation case 70, and a fuse 80. For example, the electronic device 10 is used as a noise filter.

Figure 2:
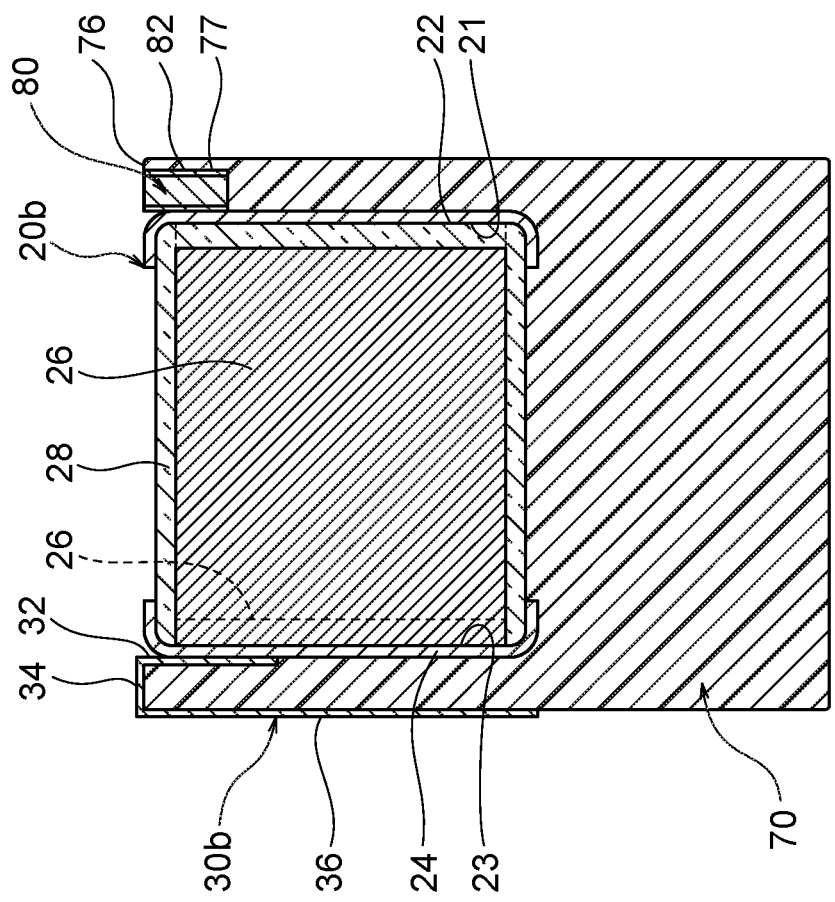
FIG. 2 is a cross-sectional view of the electronic device shown in FIG. 1 along the II-II line.

The capacitor chips 20a and 20b each have a substantially rectangular parallelepiped shape and have substantially the same shape and size. As shown in FIG. 2, the capacitor chips 20a and 20b each have an element body in which internal electrode layers 26 and dielectric layers 28 are laminated in the Z-axis direction. A first terminal electrode 22 and a second terminal electrode 24 are formed on a first end surface 21 and a second end surface 23, respectively, facing each other in the X-axis direction (longitudinal direction) of each of the element bodies and are connected to either of the internal electrode layers 26 next to each other in the lamination direction.

The dielectric layers 28 of the capacitor chips 20a and 20b are made of any material and are made of, for example, dielectric materials, such as calcium titanate, strontium titanate, barium titanate, and these mixture. Each of the dielectric layers 28 has any thickness, but normally has a thickness of 1 μm to hundreds of μm. In the present embodiment, preferably, each of the dielectric layers 28 has 1.0-5.0 μm.

The internal electrode layers 26 contain a conductive material. The conductive material contained in the internal electrode layers 26 is not limited, but can be a comparatively inexpensive base metal if the dielectric layers 28 are made of reduction resistance material. Preferably, the base metal is Ni or a Ni alloy. Preferably, the Ni alloy is an alloy of Ni and one or more elements selected from Mn, Cr, Co, and Al. Preferably, the Ni content of this alloy is 95 wt % or more. Incidentally, Ni or the Ni alloy may contain various minor components, such as P, at about 0.1 wt % or less. The internal electrode layers 26 may be formed using a commercially available electrode paste. The thickness of each of the internal electrode layers 26 is appropriately determined based on purpose or so.

The terminal electrodes 22 and 24 are also made of any material and are normally made of copper, copper alloy, nickel, nickel alloy, etc., but can also be made of silver, an alloy of silver and palladium, etc. The terminal electrode 22

(24) may also have any thickness, but normally has a thickness of about 10-50 µm. Incidentally, at least one metal film selected from Ni, Cu, Sn, etc. may be formed on the surface of the terminal electrode 22 (24).

The shape and size of the capacitor chip 20a (20b) are appropriately determined based on purpose and application. For example, the capacitor chip 20a (20b) has a thickness of 1.0-6.5 mm (length in the X-axis shown in FIG. 2), a width of 0.5-5.5 mm (length in the Y-axis shown in FIG. 2), and a height of 0.5-5.5 mm (length in the Z-axis shown in FIG. 2). The capacitors 20a and 20b may have mutually different sizes and shapes.

Figure 3:
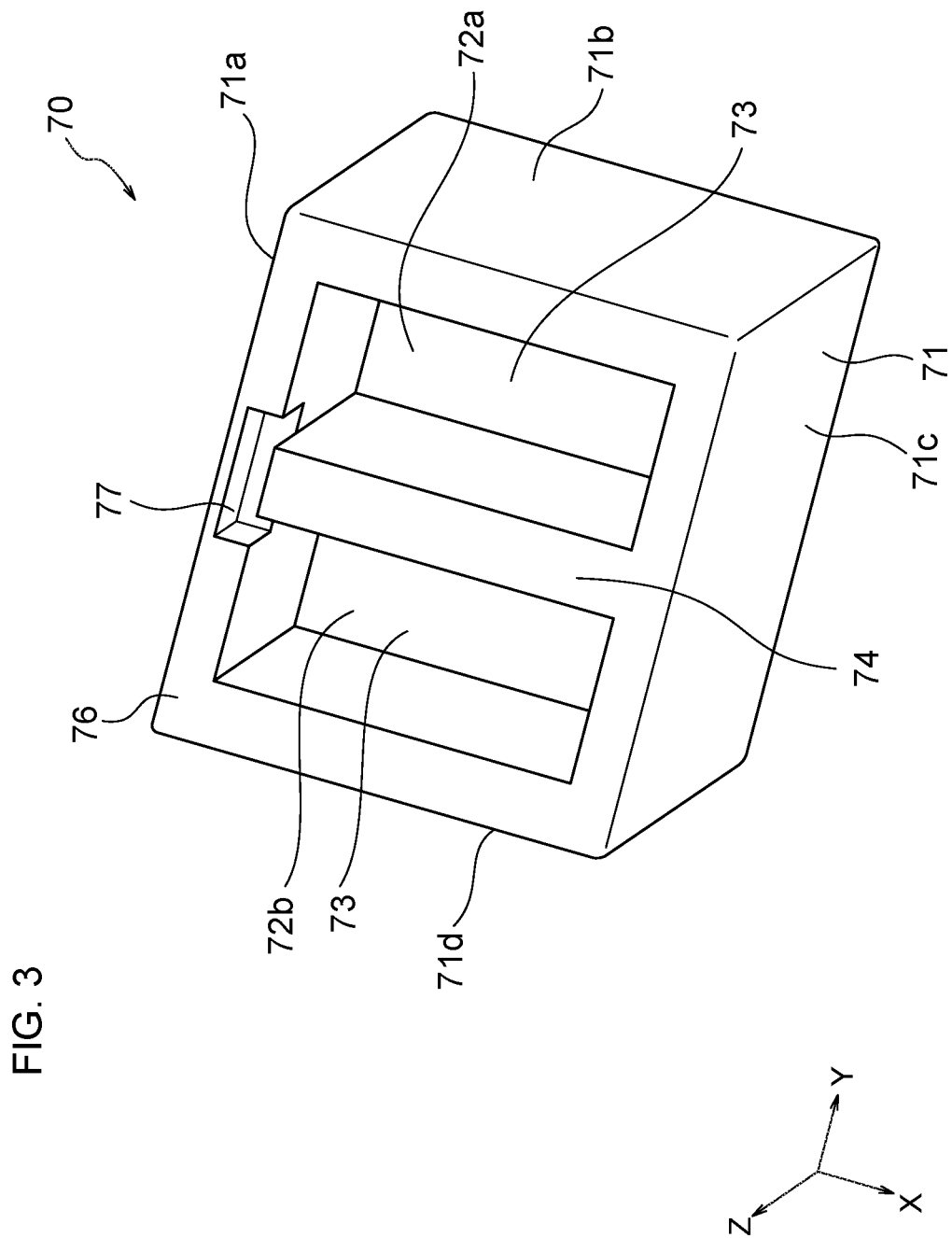
FIG. 3 is a perspective view of a case shown in FIG. 1.

As shown in FIG. 3, the insulation case 70 is formed from a rectangular parallelepiped housing and includes an outer wall 71 and a bottom wall 73 surrounding two accommodation recesses 72a and 72b opening upward in the Z-axis. The insulation case 70 is made of an insulator, such as ceramic, glass, and synthetic resin, and the insulator may be made of a flame-retardant material. The accommodation recesses 72a and 72b next to each other in the Y-axis direction are partitioned by a partition wall 74. The capacitor chips 20a and 20b shown in FIG. 1 can be accommodated into the accommodation recesses 72a and 72b, respectively.

The width of the accommodation recess 72a (72b) in each of the X-axis direction and the Y-axis direction is determined so that the capacitor chip 20a (20b) can enter the accommodation recess 72a (72b). The depth of the accommodation recess 72a (72b) in the Z-axis direction is determined so that the upper end of the capacitor chip 20a (20b) in the Z-axis direction does not protrude upward in the Z-axis direction from an open edge surface 76 when the capacitor chip 20a (20b) is accommodated in the accommodation recess 72a (72b). However, the upper end of the capacitor chip 20a (20b) in the Z-axis direction may slightly protrude upward in the Z-axis direction from the open edge surface 76.

The open edge surface 76 is formed around the open surfaces of the accommodation recesses 72a and 72b. For more detail, the open edge surface 76 is formed on the upper surface of the outer wall 71 in the Z-axis direction and extends along the open surfaces of the accommodation recesses 72a and 72b. The open edge surface 76 is flush with the upper surface of the partition wall 74 in the Z-axis direction.

The insulation case 70 is provided with a fuse hole 77 with a concave shape. The fuse 80 shown in FIG. 1 can be accommodated (embedded) into the fuse hole 77. The fuse hole 77 is formed on the open edge surface 76 and is adjacent to one end of the partition wall 74 in the X-axis direction.

The fuse hole 77 has a predetermined width in each of the X-axis direction and the Y-axis direction and also has a predetermined depth in the Z-axis direction. The width of the fuse hole 77 in each of the X-axis direction and the Y-axis direction is substantially equal to that of the fuse 80 in each of the X-axis direction and the Y-axis direction. As shown in FIG. 2, the depth of the fuse hole 77 in the Z-axis direction is substantially equal to the width of the fuse 80 in the Z-axis direction, but may be larger than the width of the fuse 80 in the Z-axis direction.

As shown in FIG. 3, a part of the fuse hole 77 in the Y-axis direction is formed so as to straddle one accommodation recess 72a and the other accommodation recess 72b next to each other in the Y-axis direction. For more detail, one end of the fuse hole 77 in the Y-axis direction protrudes toward one side of the partition wall 74 in the Y-axis direction and is connected to the accommodation recess 72a, and the other end of the fuse hole 77 in the Y-axis direction protrudes toward the other side of the partition wall 74 in the Y-axis direction and is connected to the accommodation recess 72b.

Thus, the fuse hole 77 and the accommodation recess 72a are communicated with each other, and the fuse hole 77 and the accommodation recess 72b are communicated with each other. That is, the accommodation recess 72a and the accommodation recess 72b are connected via the fuse hole 77.

Figure 4A:
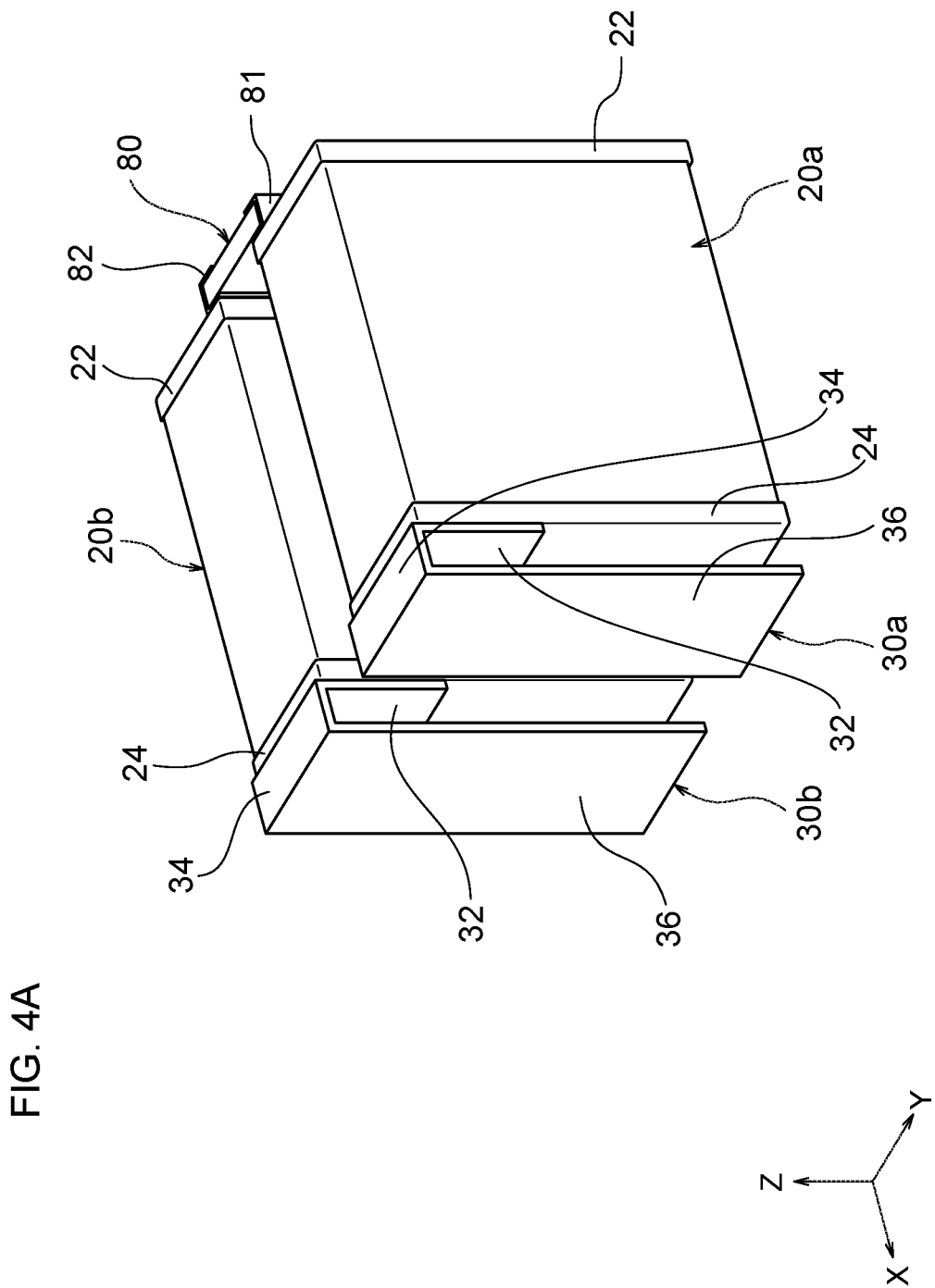
FIG. 4A is a perspective view illustrating a connection relation among chip components, conductive terminals, and a fuse.
Figure 4B:
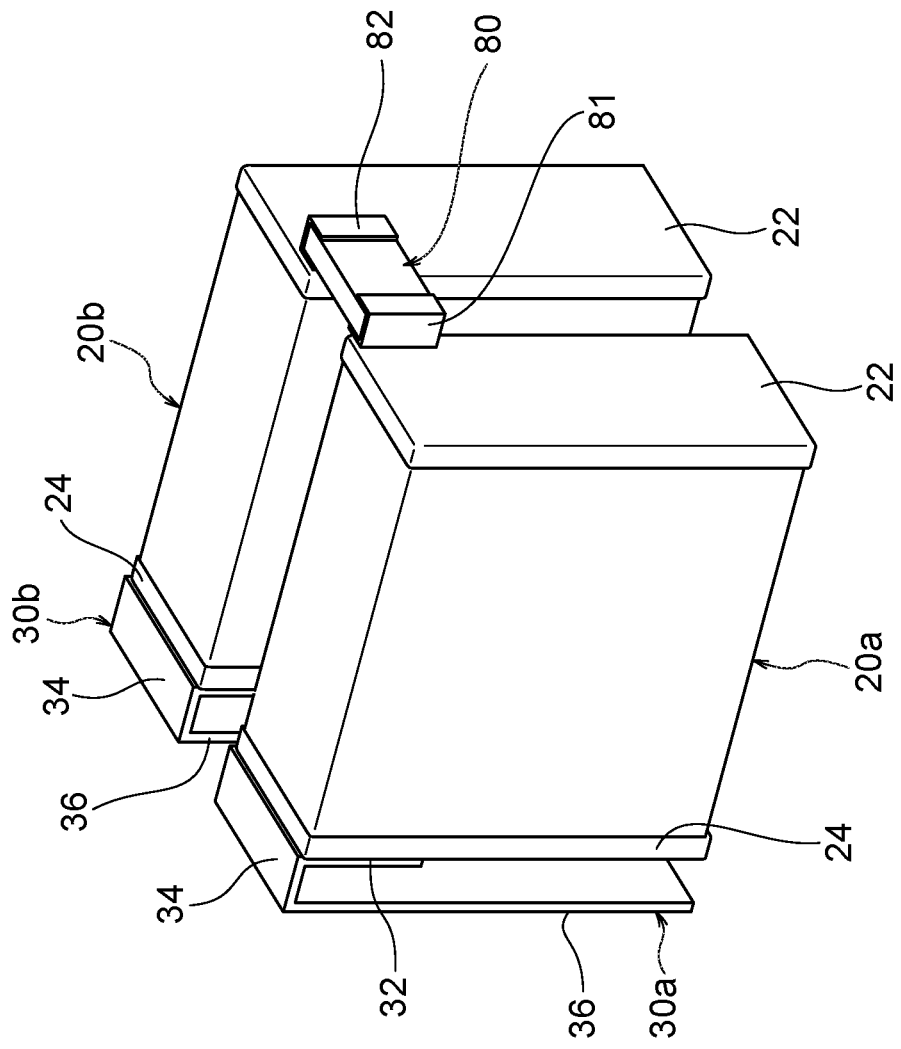
FIG. 4B is a perspective view of the connection relation shown in FIG. 4A from a different angle.

As shown in FIG. 4A and FIG. 4B, the fuse 80 has a fused portion (a conductor made of alloy or so) that is fused by Joule heat generated by an overcurrent and protects the capacitor chip 20a (20b) from the overcurrent. In addition, the fuse 80 electrically connects the capacitor chips 20a and 20b.

In the present embodiment, the fuse 80 has a chip shape, but may be, for example, a surface-mounting fuse or so. An electrode 81 is disposed on one side of the fuse 80 in the Y-axis direction, and an electrode 82 is disposed on the other side of the fuse 80 in the Y-axis direction.

When the fuse 80 is accommodated into the fuse hole 77 shown in FIG. 3, the electrode 81 of the fuse 80 and the first terminal electrode 22 of the capacitor chip 20a shown in FIG. 4A and FIG. 4B are arranged to overlap with each other at the communication point between the accommodation recess 72a and the fuse hole 77, and the electrode 81 and the first terminal electrode 22 are connected. Thus, the fuse 80 and the capacitor chip 20a are connected electrically.

Moreover, the electrode 82 of the fuse 80 and the first terminal electrode 22 of the capacitor chip 20b shown in FIG. 4A and FIG. 4B are arranged to overlap with each other at the communication point between the accommodation recess 72b and the fuse hole 77 shown in FIG. 3, and the electrode 82 and the first terminal electrode 22 are connected. Thus, the fuse 80 and the capacitor chip 20b are connected electrically.

As a result, the capacitor chip 20a accommodated in the accommodation recess 72a and the capacitor chip 20b accommodated in the accommodation recess 72b are connected electrically via the fuse 80, and the capacitor chips 20a and 20b are connected in series.

As shown in FIG. 4B, the fuse 80 directly connects the capacitor chips 20a and 20b in bridge manner. The fuse 80 is connected to the upper ends of the first terminal electrodes 22 and 22 of the capacitor chips 20a and 20b, but the connection position of the fuse 80 for the capacitor chips 20a and 20b may be shifted further downward by appropriately adjusting the depth of the fuse hole 77 shown in FIG. 3 in the Z-axis direction.

As shown in FIG. 4A and FIG. 4B, the first conductive terminals 30a and 30b are fixed to the insulation case 80 (FIG. 1) and connected to the second terminal electrodes 24 and 24 of the capacitor chips 20a and 20b. The first conductive terminals 30a and 30b have the same structure and are formed by bending a sheet of conductive plate piece (e.g., metal plate) into a substantially C shape. The metal plate has any thickness, but preferably has a thickness of about 0.01-2.0 mm. Incidentally, the first conductive terminals 30a and 30b may be formed from a conductive terminal made of a conductive material excluding metal.

The first conductive terminal 30a (30b) includes an inner electrode portion 32 (32), an open edge electrode portion 34 (34), and a side electrode portion 36 (36). The first conductive terminals 30a and 30b are attached separately and insulated with a predetermined interval in the Y-axis direction (corresponding to the thickness of the partition wall 74 shown in FIG. 3 in the Y-axis direction).

The inner electrode portion 32 (32) is inserted along the other inner wall of the accommodation recess 72a (72b) of the insulation case 70 (FIG. 3) in the X-axis direction. The inner electrode portion 32 (32) is contacted and electrically connected to the second terminal electrode 24 (24) of the capacitor chip 20*a* (20*b*). In a state where the first conductive terminals 30*a* and 30*b* are attached to the insulation case 70, the second terminal electrode 24 (24) of the capacitor chip 20*a* (20*b*) is contacted with pressure to the inner electrode portion 32 (32).

The open edge electrode portion 34 (34) is formed continuously to the inner electrode portion 32 (32) and disposed along the open edge surface 76 of the insulation case 70 (FIG. 3). The open edge electrode portion 34 (34) is preferably contacted with the open edge surface 76, but there may be a slight gap between the open edge electrode portion 34 (34) and the open edge surface 76. When the electronic device 10 is mounted on a board, the open edge electrode portion 34 (34) is connected to a land, and the upper surface of the insulation case 70, on which the open edge surface 76 is located, is a mounting surface. Incidentally, the side electrode portion 36 (36) may be connected to a land, and the side surface of the insulation case 70 where the side electrode portion 36 (36) is located may be a mounting surface.

The side electrode portion 36 (36) is formed continuously (and integrally) to the open edge electrode portion 34 (34) and disposed along the outer surface of the outer wall 71 of the insulation case 70 (FIG. 3). The side electrode portion 36 (36) is formed so as to extend in the Z-axis direction along the outer surface of the outer wall 71, and the lower end of the side electrode portion 36 (36) is disposed below a substantially central part of the outer wall 71 in the Z-axis direction. Incidentally, the side electrode portions 36 and 36 do not need to be contacted with the outer surface of the outer wall 71 and may be arranged in parallel with a predetermined gap to the outer surface of the outer wall 71.

Hereinafter, a method of manufacturing the electronic device 10 is explained with reference to FIG. 3 and FIG. 4A.

The capacitor chips 20*a* and 20*b* are manufactured by a normal method of manufacturing a multilayer ceramic capacitor.

In the manufacture of the first conductive terminal 30*a*, first, a flat metal plate is prepared. The metal plate is made of any conductive metal material, such as iron, nickel, copper, silver, and an alloy including them. Then, the metal plate is machined to obtain intermediate members having the shapes of the inner electrode portion 32, the open edge electrode portion 34, and the side electrode portion 36.

Next, a metal film is formed by plating on the surfaces of the intermediate members formed by machining to obtain the first conductive terminal 30*a*. The material of the plating is not limited, but is, for example, Ni, Sn, Cu, etc. In the manufacture of the first conductive terminal 30*a*, a plurality of first conductive terminals 30*a* may be formed in a mutually connected state from a metal plate continuing in band manner. The first conductive terminal 30*b* is manufactured similarly to the first conductive terminal 30*a*.

The first conductive terminals 30*a* and 30*b* obtained as mentioned above are attached to the insulation case 70. The insulation case 70 can be manufactured by, for example, injection molding. The first conductive terminals 30*a* and 30*b* can be attached to the insulation case 70 by inserting the inner electrode portions 32 along the inner wall surfaces of the accommodation recesses 72*a* and 72*b* of the insulation case 70 formed on one side in the X-axis direction.

Finally, the capacitor chips 20*a* and 20*b* are inserted from above the openings into the accommodation recesses 72*a* and 72*b*, the fuse 80 is inserted from above the opening into the fuse hole 77, and the first terminal electrode 22 of the capacitor chip 20*a* and the first terminal electrode 22 of the capacitor chip 20*b* are connected in series via the fuse 80. As a result, the electronic device 10 shown in FIG. 1 can be manufactured. Incidentally, the fuse 80 can be a commercially available one.

The electronic device 10 according to the present embodiment includes the insulation case 70 including the accommodation recesses 72*a* and 72*b* for accommodating the capacitor chips 20*a* and 20*b*. When the capacitor chips 20*a* and 20*b* are accommodated into the accommodation recesses 72*a* and 72*b*, respectively, various types of circuits, such as a series circuit consisting of the capacitor chips 20*a* and 20*b* connected in series and a parallel circuit consisting of the capacitor chips 20*a* and 20*b* connected in parallel, can be obtained with one electronic device 10, and the electronic device 10 with various functions can be obtained. When the electronic device 10 is mounted on a board, the capacitor chips 20*a* and 20*b* can be connected to an external circuit altogether, and the mounting is easier than when the capacitor chips 20*a* and 20*b* are individually mounted on a board. When the capacitor chips 20*a* and 20*b* are accommodated into the accommodation recesses 72*a* and 72*b*, respectively, the capacitor chips 20*a* and 20*b* can be protected effectively from impact or so.

The electronic device 10 according to the present embodiment includes the fuse 80 for electrically connecting the capacitor chips 20*a* and 20*b*. Thus, when an overcurrent flows through the capacitor chip 20*a* (capacitor chip 20*b*) due to breakdown or so, the fuse 80 connected to the capacitor chip 20*a* (capacitor chip 20*b*) is electrically cut (fused), the electrical connection between the capacitor chips 20*a* and 20*b* via the fuse 80 is released, and the overcurrent does not flow through the capacitor chip 20*b* (capacitor chip 20*a*). Thus, the capacitor chip 20*b* (capacitor chip 20*a*) can be protected from damage, and a board or so can be prevented from being damaged due to heat generated by the overcurrent. Thus, the electronic device 10 according to the present embodiment can have a high safety.

When the fuse 80 is a commercially available one, in a case where the fuse 80 is damaged, the above-mentioned functions can be exhibited again by simply replacing the damaged fuse 80 with a new fuse, and the electronic device 10 can have a high cost performance.

In the present embodiment, the fuse 80 directly connects the capacitor chips 20*a* and 20*b*. Thus, the fuse 80 itself can be used instead of the first conductive terminals 30*a* and 30*b*, and the structure of the electronic device 10 can be simplified. In addition, the capacitor chips 20*a* and 20*b* can be connected in serried via the fuse 80. Thus, if the capacitor chip 20*a* (capacitor chip 20*b*) has a short circuit failure, this influence can effectively be prevented from reaching the capacitor chip 20*b* (capacitor chip 20*a*).

When the fuse 80 is attempted to be connected to the respective capacitor chips 20*a* and 20*b*, it is necessary to prepare the same number (2) of fuses 80 as the number of capacitor chips 20*a* and 20*b*. Thus, not only the cost or manufacturing man-hours increase, but also the installation space of the fuses 80 increases, and the electronic device 10 may become larger. On the other hand, when the capacitor chips 20*a* and 20*b* are connected in series via the fuse 80, it is enough to prepare a number (1) of fuses 80 that is smaller than the number of capacitor chips 20*a* and 20*b*. Thus, it is possible to prevent increase in cost or manufacturing man-hours, and the electronic device 10 can be prevented from being larger due to increase in the installation space of the fuse 80.

In the present embodiment, the insulation case 70 includes the fuse hole 77 having a recess shape for accommodating the fuse 80. Thus, the fuse 80 can be fixed to the insulation case 70 by simply accommodating the fuse 80 into the fuse hole 77. Since the fuse 80 is accommodated in the fuse hole 77, the fuse 80 can be protected from external factors, such as external force.

In the present embodiment, the fuse hole 77 is formed on the open edge surface 76 around the open surfaces of the accommodation recesses 72a and 72b and straddles the accommodation recesses 72a and 72b next to each other. Thus, when the fuse 80 is accommodated into the fuse hole 77, the fuse 80 is disposed near the first terminal electrodes 22 and 22 of the capacitor chips 20a and 20b accommodated in the accommodation recesses 72a and 72b and is formed over the first terminal electrodes 22 and 22. Thus, the first terminal electrodes 22 and 22 of the capacitor chips 20a and 20b can easily electrically be connected via the fuse 80.

In the present embodiment, the fuse 80 has a chip shape. Thus, the fuse 80 can easily be connected to the first terminal electrodes 22 and 22 of the capacitor chips 20a and 20b via the electrodes 81 and 82.

Second Embodiment

Except for the following matters, an electronic device 10A according to Second Embodiment of the present invention has structure and effect similar to those of the electronic device 10 according to First Embodiment. In FIG. 5 to FIG. 8, the common members with the electronic device 10 according to First Embodiment are given the common references and are not partly explained.

Figure 5:
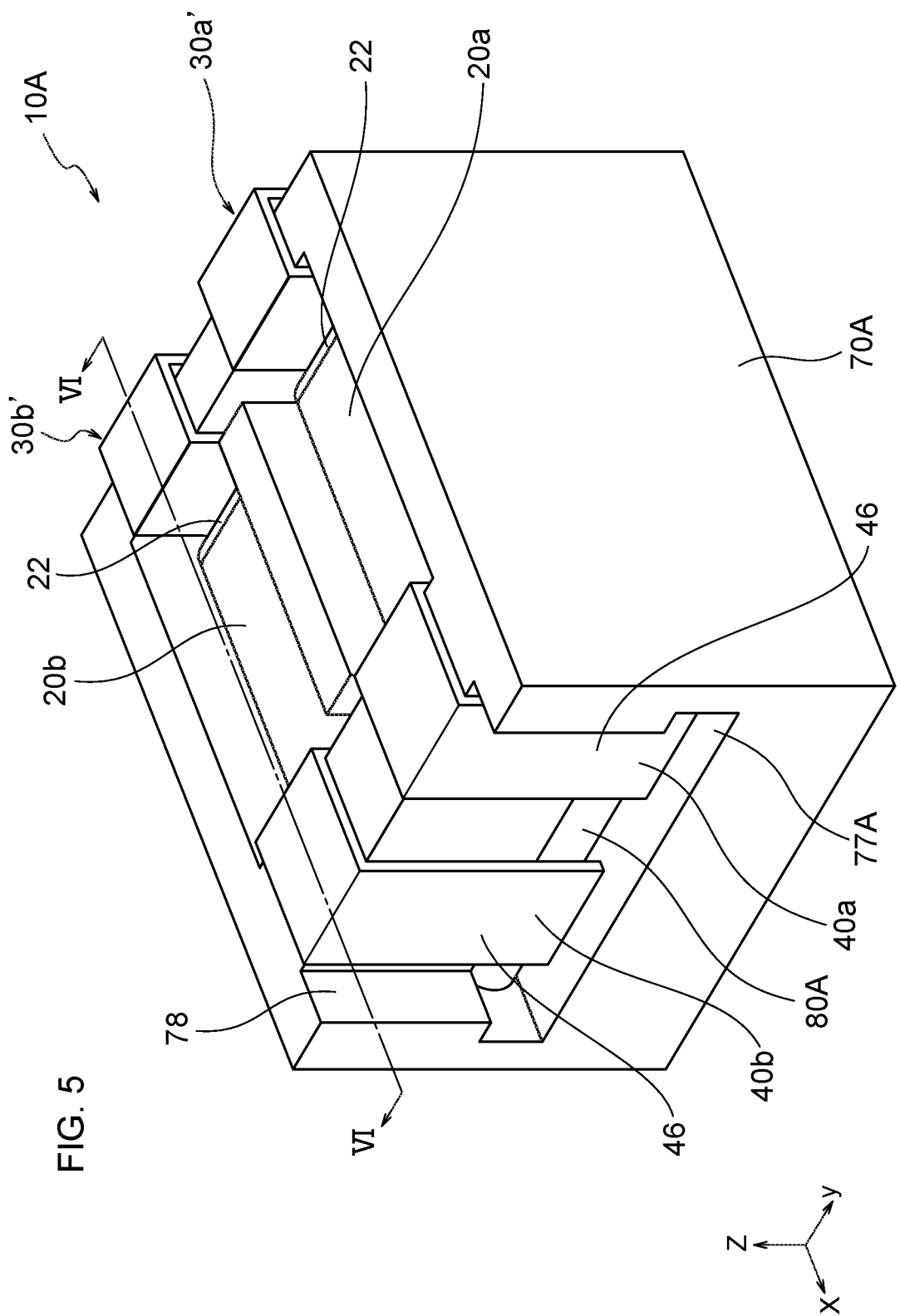
FIG. 5 is a perspective view of an electronic device according to Second Embodiment of the present invention.

As shown in FIG. 5, the electronic device 10A includes an insulation case 70A instead of the insulation case 70 according to First Embodiment. In addition to the capacitor chips 20a and 20b, the insulation case 70A includes first conductive terminals 30a' and 30b', second conductive terminals 40a and 40b, and a fuse 80A.

Figure 8:
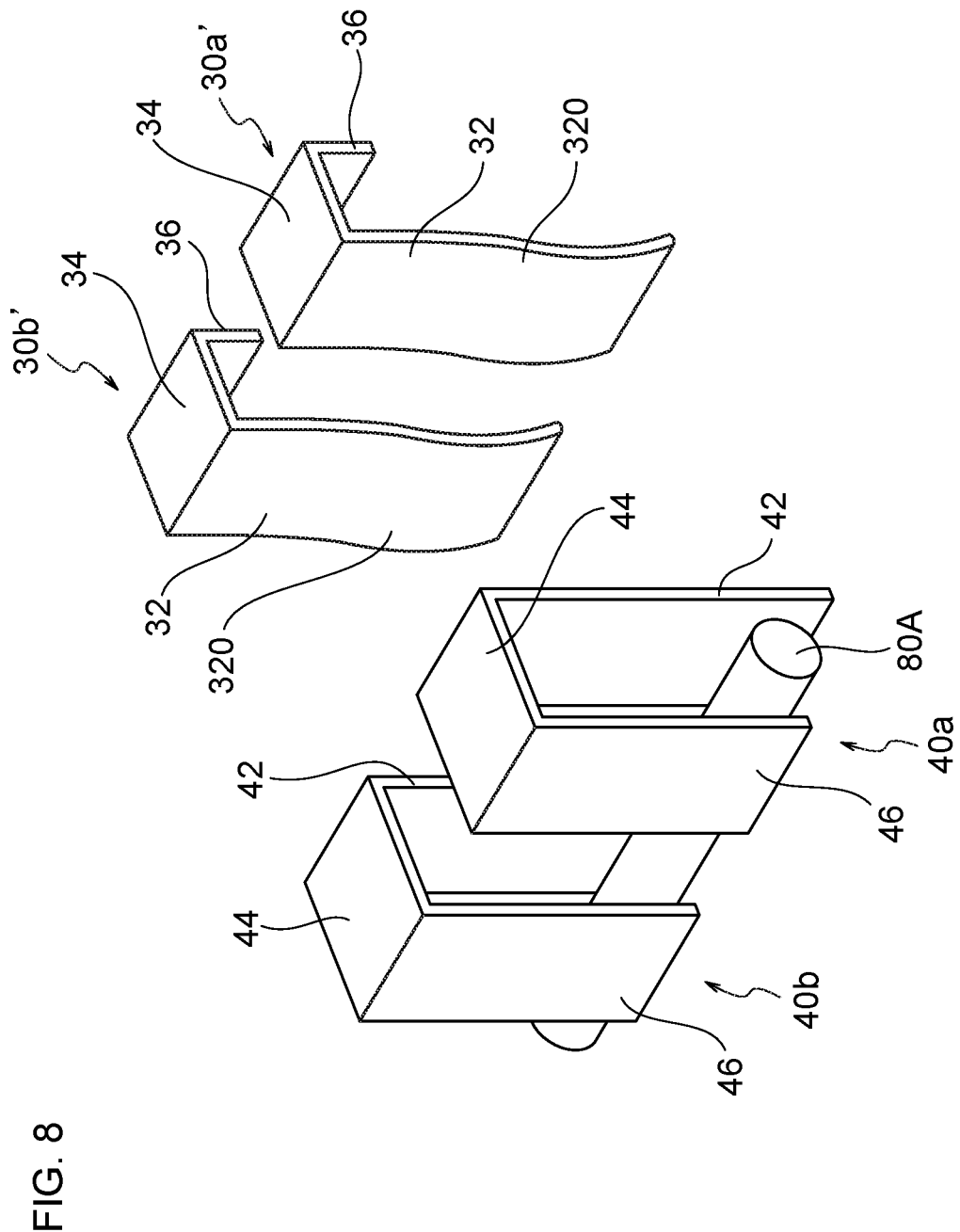
FIG. 8 is a perspective view of conductive terminals and a fuse shown in FIG. 5.

As shown in FIG. 8, the first conductive terminals 30a' and 30b' are different from the first conductive terminals 30a and 30b according to First Embodiment in that the inner electrode portion 32 (32) includes a curved portion 320 (320). The curved portion 320 (320) has a function of pushing the capacitor chip 20a (20b) by spring force. In this structure, the inner electrode portion 32 (32) and the first terminal electrode 22 (22) of the capacitor chip 20a (20b) (FIG. 6) can be connected in pressure contact state and do not need to be connected by a connection member, such as solder and conductive adhesive agent.

Figure 6:
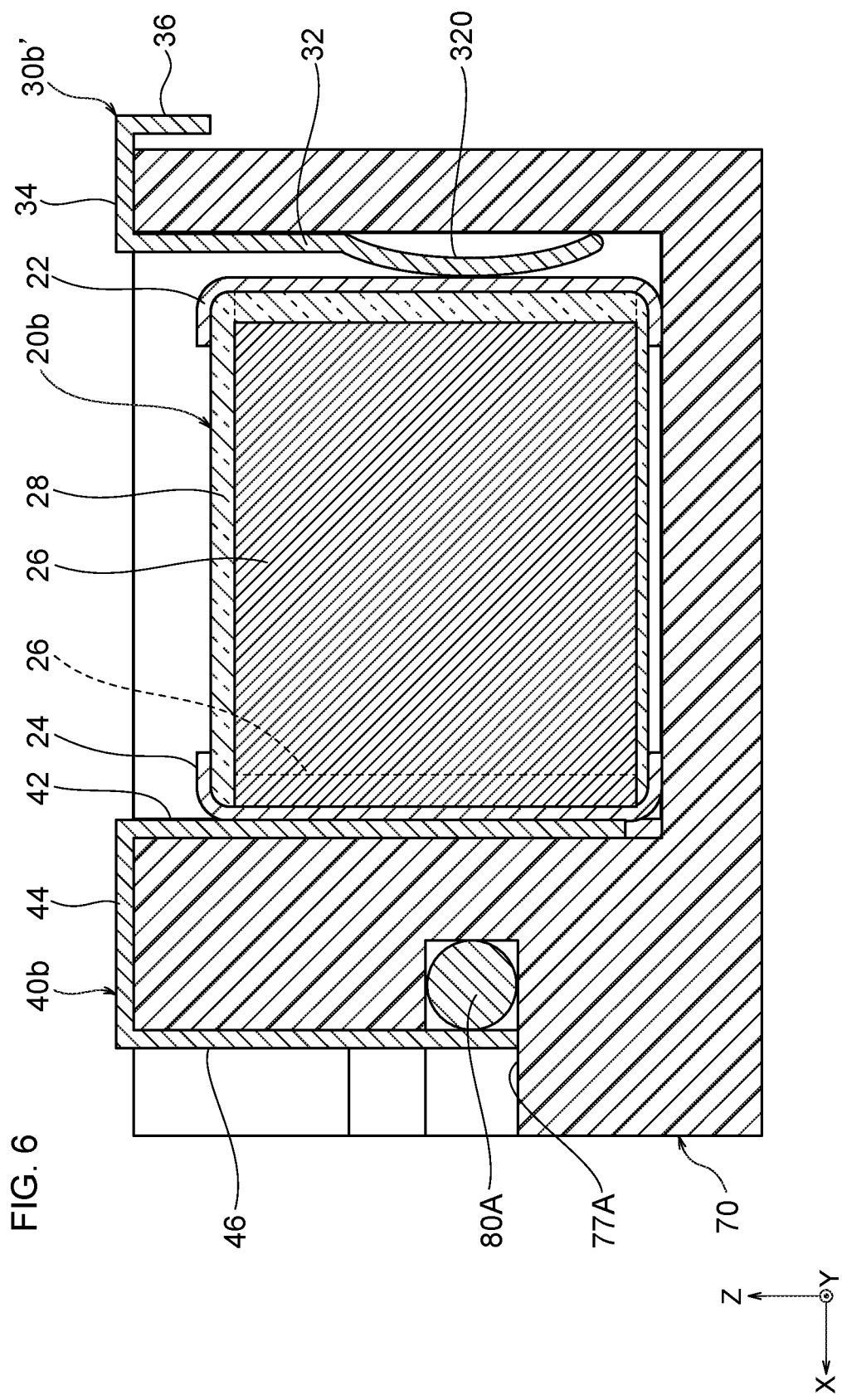
FIG. 6 is a cross-sectional view of the electronic device shown in FIG. 5 along the VI-VI line.

The first conductive terminal 40a (40b) includes an inner electrode portion 42 (42), an open edge electrode portion 44 (44), and a side electrode portion 46 (46). The inner electrode portion 42 (42) is connected to the second terminal electrode 24 (24) of the capacitor chip 20a (20b) (FIG. 6). The open edge electrode portion 44 (44) is fixed on the open edge surface 76 of the insulation case 70A. The side electrode portion 46 (46) is fixed on the outer wall 71 (side surface 71a) of the insulation case 70A.

Figure 7A:
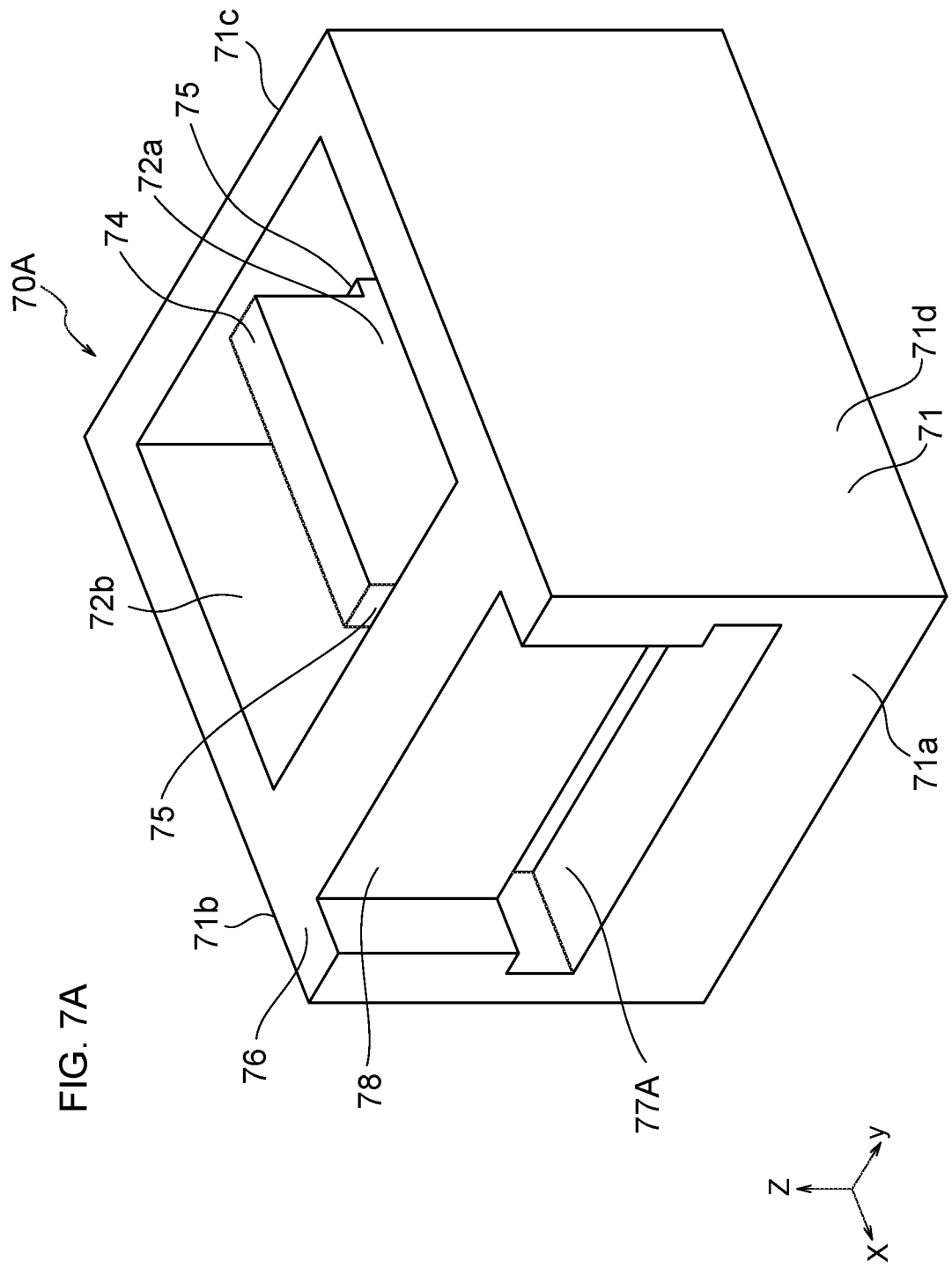
FIG. 7A is a perspective view of a case shown in FIG. 5.
Figure 7B:
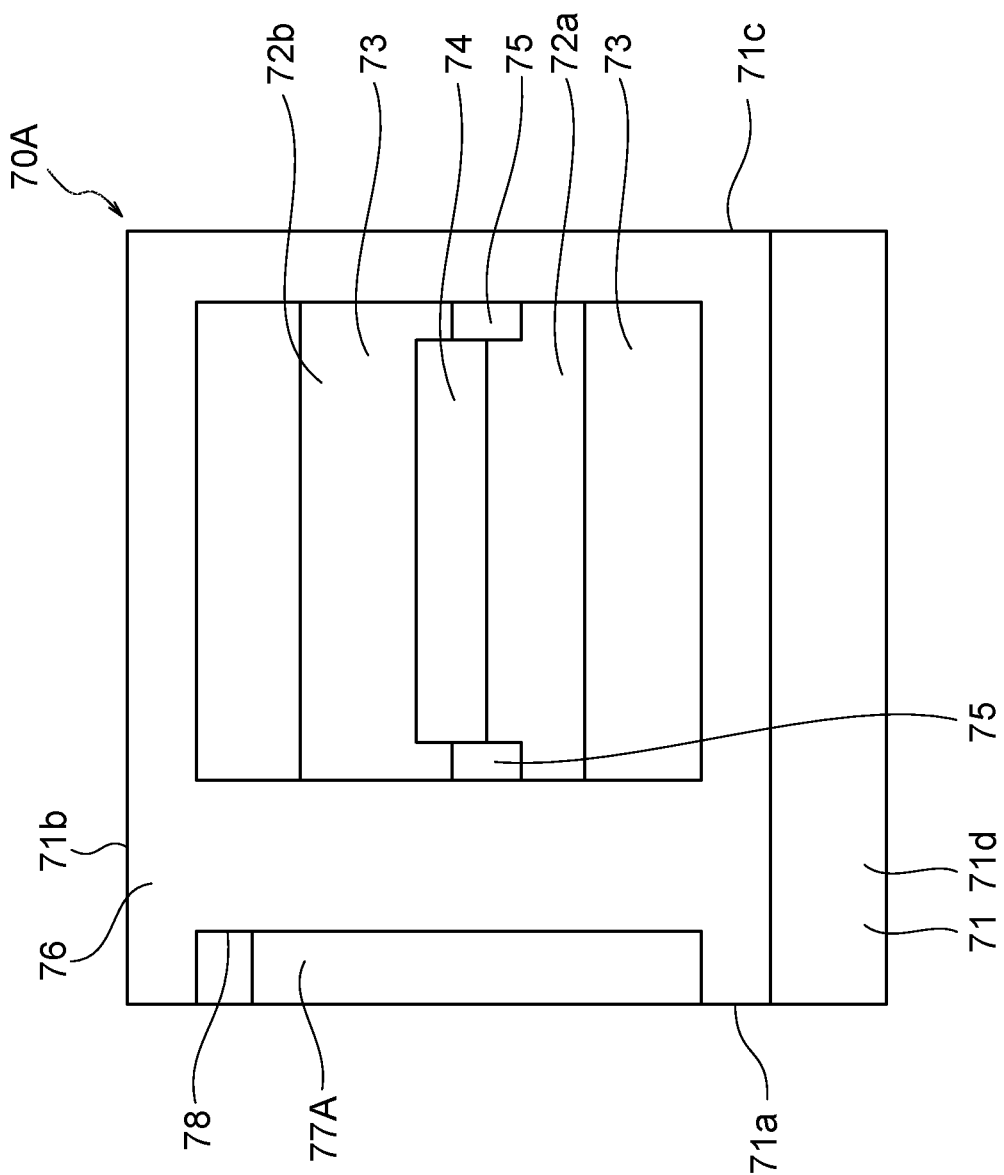
FIG. 7B is a perspective view of the case shown in FIG. 7A from a different angle.

As shown in FIG. 7A and FIG. 7B, the insulation case 70A is different from the insulation case 70 according to First Embodiment in that the insulation case 70A includes a fuse hole 77A and a terminal installation groove 78. Hereinafter, a side surface 71a, a side surface 71b, a side surface 71c, and a side surface 71d of the insulation case 70A are a surface facing the positive side in the X-axis direction (a surface perpendicular to the longitudinal direction of the accommodation recesses 72a and 72b), a surface facing the negative side in the Y-axis direction, a surface facing the negative side in the X-axis direction, and a surface facing the positive side in the Y-axis direction, respectively.

The fuse hole 77A is formed on the side (side surface 71a) of the insulation case 70A. The fuse 80A (FIG. 5) can be accommodated into the fuse hole 77A. The fuse hole 77A has a predetermined width in each of the Y-axis direction and the Z-axis direction and a predetermined depth in the X-axis direction. The fuse hole 77A straddles a region of the accommodation recess 72a formed on one side in the Y-axis direction and a region of the accommodation recess 72b formed on the other side in the Y-axis direction.

The width of the fuse hole 77A in each of the Y-axis direction and the Z-axis direction is a width into which the fuse 80A can be inserted. The depth of the fuse hole 77A in the Z-axis direction is appropriately determined so that the fuse 80A is internally adjacent to an arrangement position of the side electrode portions 46 and 46 of the second conductive terminals 40a and 40b as shown in FIG. 6 at the time of accommodating the fuse 80A into the fuse hole 77A.

As shown in FIG. 7A and FIG. 7B, the terminal installation groove 78 is formed on the side (side surface 71a) of the insulation case 70A. The terminal installation groove 78 has a predetermined width in the Y-axis direction and a predetermined depth in each of the X-axis direction and the Z-axis direction. The width of the terminal installation groove 78 is in the Y-axis direction is smaller than that of the fuse hole 77A in the Y-axis direction. The terminal installation groove 78 is formed in a region in the Z-axis direction from the open edge surface 76 to the fuse hole 77A and is connected to the upper end of the fuse hole 77A. As shown in FIG. 5, the side electrode portions 46 and 46 of the second conductive terminals 40a and 40b are arranged in the terminal installation groove 78. Incidentally, the lower ends of the side electrode portions 46 and 46 protrude downward from the terminal installation groove 78 and are arranged over the fuse hole 77A.

In the example of FIG. 7A and FIG. 7B, the accommodation recesses 72a and 72b are communicated with each other via communication grooves 75 and 75 formed at one end and the other end of the partition wall 74 in the X-axis direction. The communication grooves 75 and 75 are formed along the inner wall surfaces of the accommodation recesses 72a and 72b on one side and the other side in the X-axis direction. The communication grooves 75 and 75 are as deep as the accommodation recesses 72a and 72b in the Z-axis direction. For example, conductive terminals arranged over the accommodation recesses 72a and 72b via the communication grooves 75 and 75 may be attached along the inner wall surfaces of the accommodation recesses 72a and 72b.

In the present embodiment, as shown in FIG. 8, the fuse 80A has a bar shape (round bar or elongated cylinder). Each of one end and the other end of the fuse 80A in the Y-axis direction is provided with an electrode not shown. Each of the electrodes is connected to the side electrode portion 46 (46) of the second conductive terminal 40a (40b).

As shown in FIG. 5, when the fuse 80A is accommodated into the fuse hole 77A and the second conductive terminals 40a and 40b are fixed to the insulation case 70A, the opening of the fuse hole 77A is partly covered with the side electrode portions 46 and 46 of the second conductive terminals 40a and 40b. At the same time, the side electrode portions 46 and 46 are contacted with the ends of the fuse 80A in the Y-axis direction, and the fuse 80A is pushed by the elastic forces of the second conductive terminals 40a and 40b as shown in FIG. 6. Thus, the fuse 80A can be prevented from falling off from the fuse hole 77A and is fixed inside the fuse hole 77A.

In the present embodiment, the fuse 80A indirectly connects the capacitor chips 20a and 20b via the second conductive terminals 40a and 40b. Thus, the capacitor chip 20a connected to the second conductive terminal 40a and the capacitor chip 20b connected to the second conductive terminal 40b can be connected in series via the fuse 80A. Thus, if the capacitor chip 20a (capacitor chip 20b) has a short circuit failure, this influence can effectively be prevented from reaching the capacitor chip 20b (capacitor chip 20a).

In the present embodiment, the fuse hole 77A is formed on the side (side surface 71a) of the insulation case 70A and straddles regions of the accommodation recesses 72a and 72b next to each other. Since the fuse hole 77A is formed on the side of the insulation case 70A, the fuse 80A can be fixed to the side of the insulation case 70A and can be prevented from contacting with a board or so at the time of mounting the electronic device 10A on the board with the upper surface of the insulation case 70A (surface on which the open edge surface 76 is formed) as a mounting surface.

When the fuse hole 77A is formed over regions of the accommodation recesses 72a and 72b next to each other, the fuse 80A is disposed to straddle the second terminal electrode 24 of the capacitor chip 20a accommodated in one accommodation recess 72a and the second terminal electrode 24 of the capacitor chip 20b accommodated in the other accommodation recess 72b. Thus, the second terminal electrodes 24 of the capacitor chips 20a and 20b can easily electrically be connected via the fuse 80A.

In the present embodiment, the fuse 80A has a bar shape. Thus, the fuse 80A can easily be disposed over regions of the accommodation recesses 72a and 72b next to each other, and the second terminal electrodes 24 of the capacitor chips 20a and 20b can easily electrically be connected via the fuse 80A. A series circuit consisting of two capacitor chips 20a and 20b can be formed by mounting the first conductive terminals 30a' and 30b' located on the other side of the fuse 80A in the X-axis direction onto a circuit board or so.

In the present embodiment, the fuse 80A is pushed by the elastic forces of the side electrode portions 46 and 46 of the second conductive terminals 40a and 40b and is thereby fixed inside the fuse hole 77A. Thus, the fuse 80A can firmly be fixed inside the fuse hole 77A and can be prevented from falling off.

Third Embodiment

Figure 9:
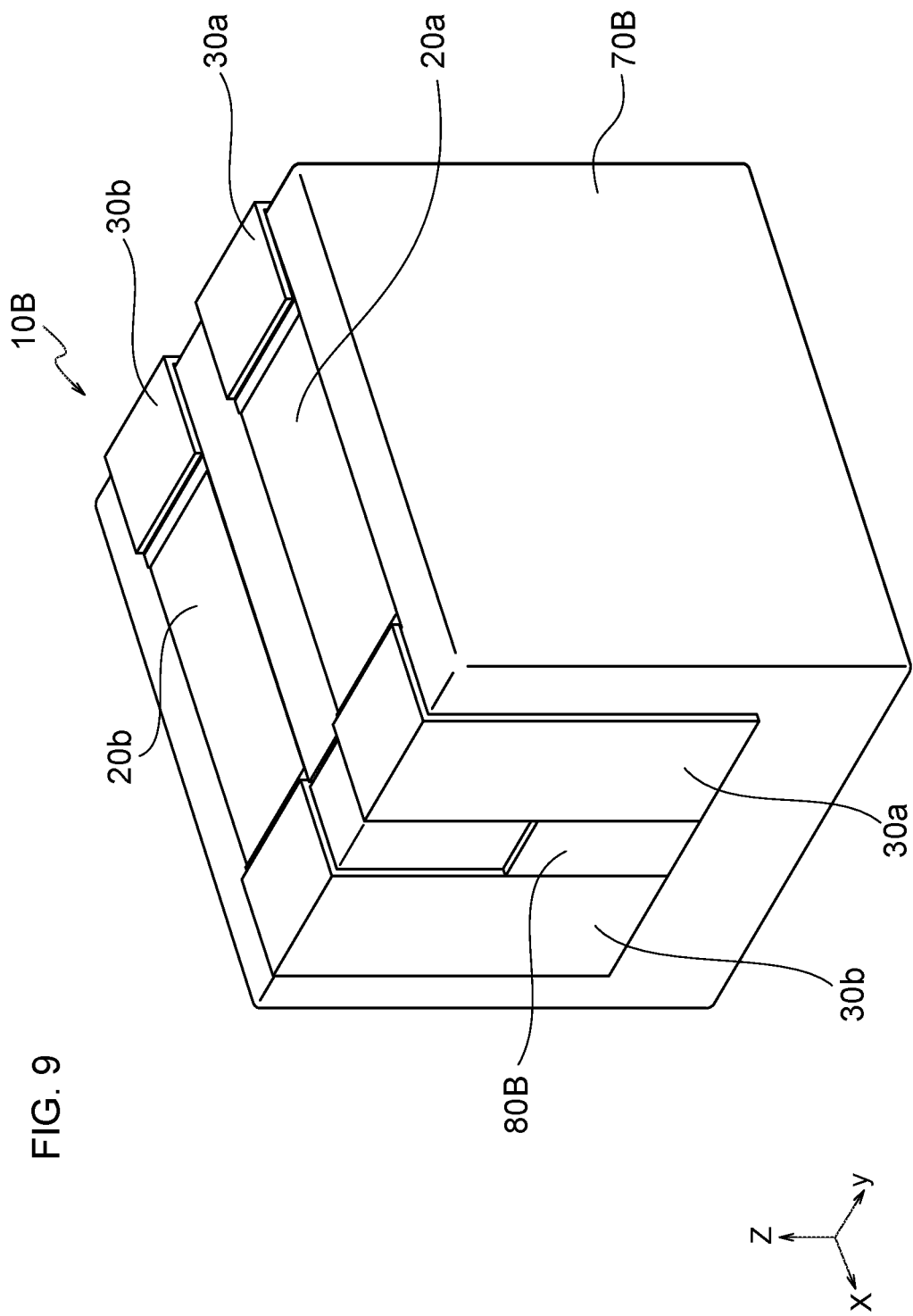
FIG. 9 is a perspective view of an electronic device according to Third Embodiment of the present invention.
Figure 10:
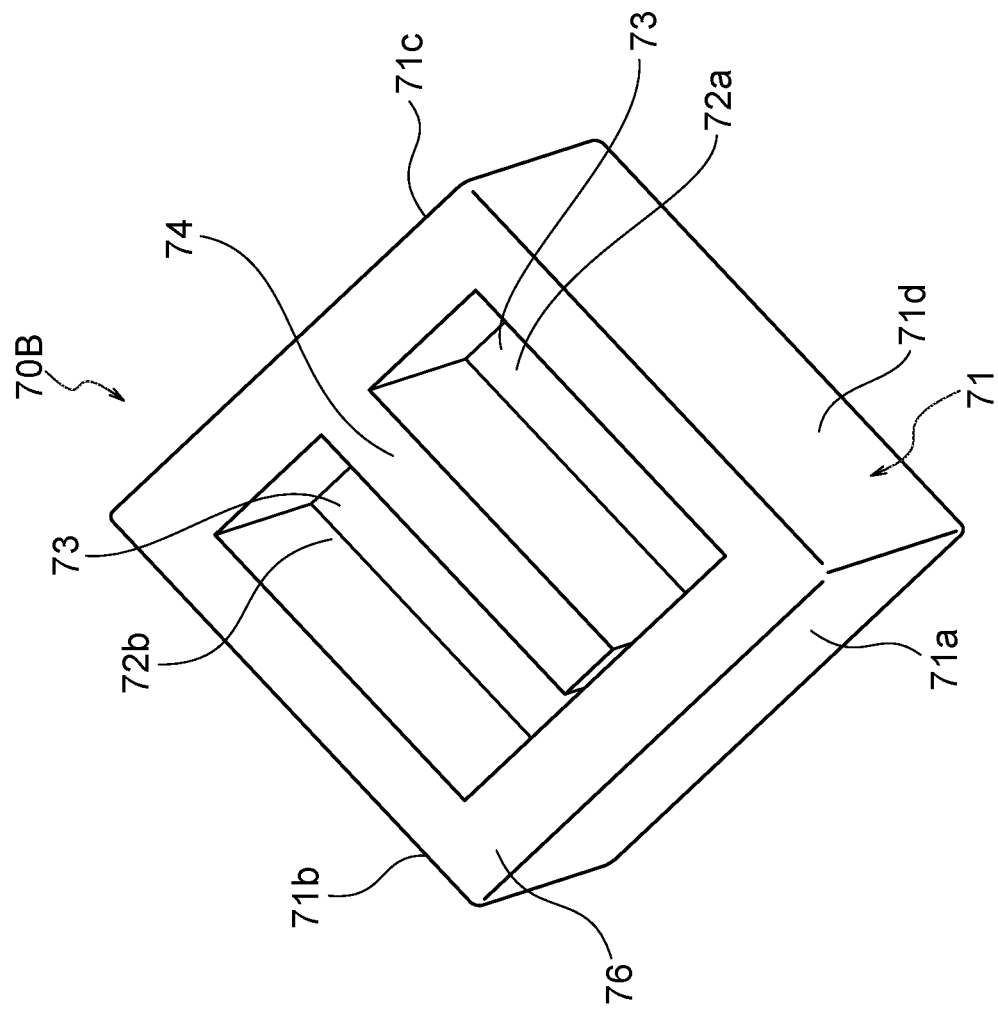
FIG. 10 is a perspective view of a case shown in FIG. 9.
Figure 11:
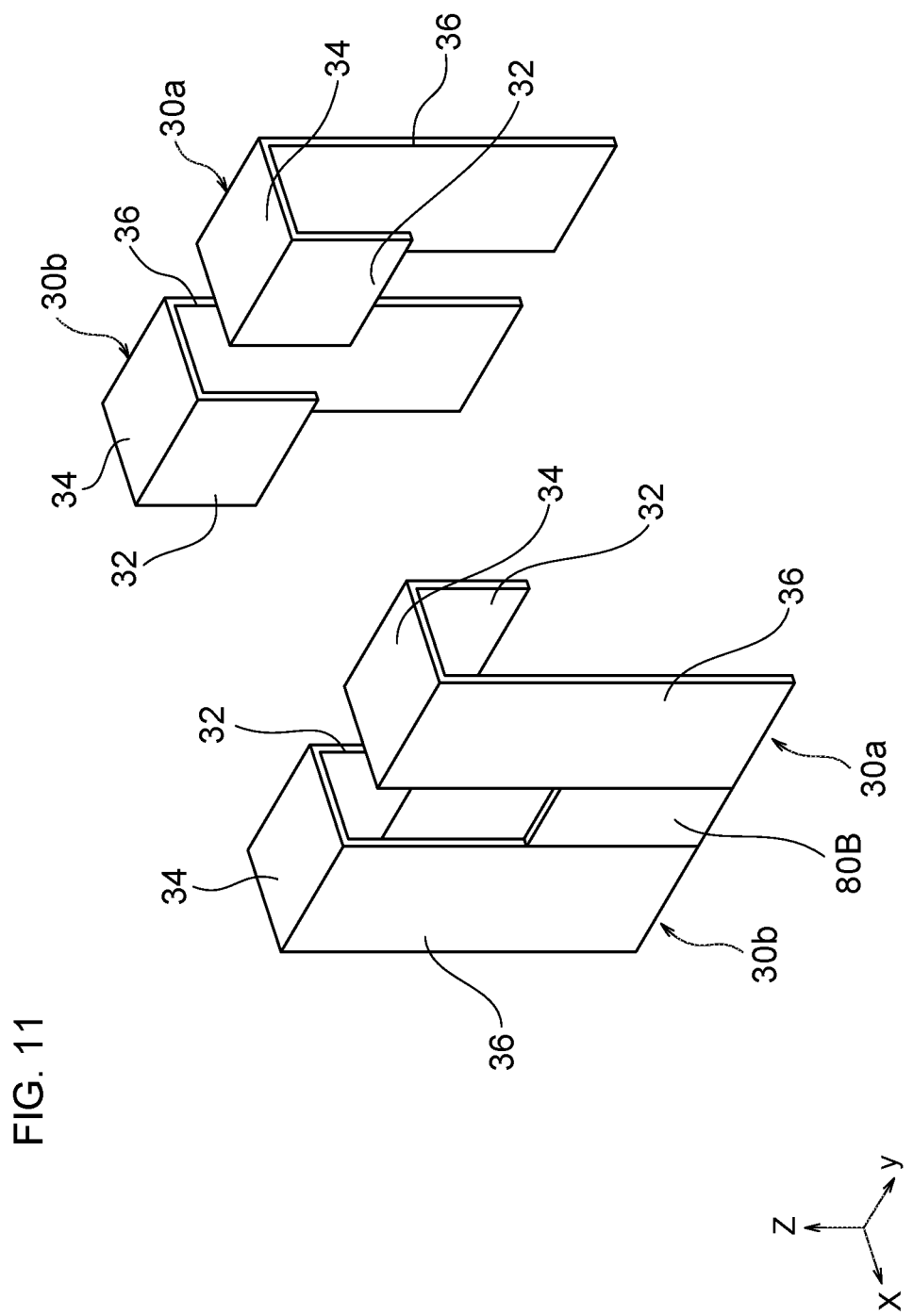
FIG. 11 is a perspective view of conductive terminals and a fuse shown in FIG. 10.

Except for the following matters, an electronic device 10B according to Third Embodiment of the present invention has structure and effect similar to those of the electronic device 10 according to First Embodiment. In FIG. 9 to FIG. 11, the common members with the electronic device 10 according to First Embodiment are given the common references and are not partly explained.

As shown in FIG. 9, the electronic device 10B includes an insulation case 70B instead of the insulation case 70 according to First Embodiment. In addition to the capacitor chips 20a and 20b and the first conductive terminals 30a and 30b, the insulation case 70B includes a fuse 80B.

As shown in FIG. 10, the insulation case 70B is different from the insulation case 70 according to First Embodiment in that the insulation case 70B does not includes the fuse hole 77. In the accommodation recess 72a (72b), the first conductive terminal 30a (30b) is fixed not only on one side, but also on the other side in the X-axis direction.

As shown in FIG. 9, the fuse 80B is fixed on the surface (side surface 71a) of the insulation case 70B. The fuse 80B has a thin flat plate shape and is provided with electrodes not shown on one side and the other side in the Y-axis direction. However, the shape of the fuse 80B is not limited thereto and may be changed appropriately. As shown in FIG. 11, the fuse 80B is disposed between the side electrode portion 36 of the first conductive terminal 30a and the side electrode portion 36 of the second conductive terminal 30b.

The distance between the first conductive terminal 30a and the first conductive terminal 30b is substantially equal to the width of the fuse 80B in the Y-axis direction. Thus, the fuse 80B is fixed on the surface of the insulation case 70B so as to completely be within the gap between the first conductive terminal 30a and the first conductive terminal 30b.

The fuse 80B is sandwiched by the first conductive terminal 30a and the first conductive terminal 30b (by holding forces of the first conductive terminal 30a and the first conductive terminal 30b or their elastic forces) and is thereby fixed, but the fuse 80B may be fixed on the surface of the insulation case 70B by adhesive agent. Instead, the electrodes (not shown) of the fuse 80B at both ends in the Y-axis direction may be soldered to the first conductive terminal 30a and the first conductive terminal 30b, respectively, or may be adhered by conductive adhesive agent.

In the illustrated example, the attachment position of the fuse 80B for the first conductive terminals 30a and 30b is the lower ends of the side electrode portions 36 and 36 of the first conductive terminals 30a and 30b. However, the attachment position of the fuse 80B for the first conductive terminals 30a and 30b is not limited to this position and may be the upper ends of the side electrode portions 36 and 36 or approximately central parts of the side electrode portions 36 and 36.

In the present embodiment, the fuse 80B is fixed on the surface of the insulation case 70B. Thus, the electronic device 10B with the fuse 80B can be obtained via an easy step of simply attaching the fuse 80B onto the surface of the insulation case 70B, and the manufacturing process can be simplified.

In the present embodiment, the fuse 80B is disposed between the first conductive terminals 30a and 30b. Thus, the first conductive terminals 30a and 30b can easily electrically be connected via the fuse 80B. A series circuit consisting of two capacitor chips 20a and 20b can be formed by mounting the first conductive terminals 30a and 30b located on the other side of the fuse 80B in the X-axis direction onto a circuit board or so.

In the present embodiment, the electronic device 10B with the fuse 80B can be obtained via an easy step of, for example, attaching the fuse 80B onto the side electrode portions 36 of the first conductive terminals 30a and 30b exposed to the outside of the insulation case 70B, and the manufacturing process can be simplified.

Fourth Embodiment

Figure 12:
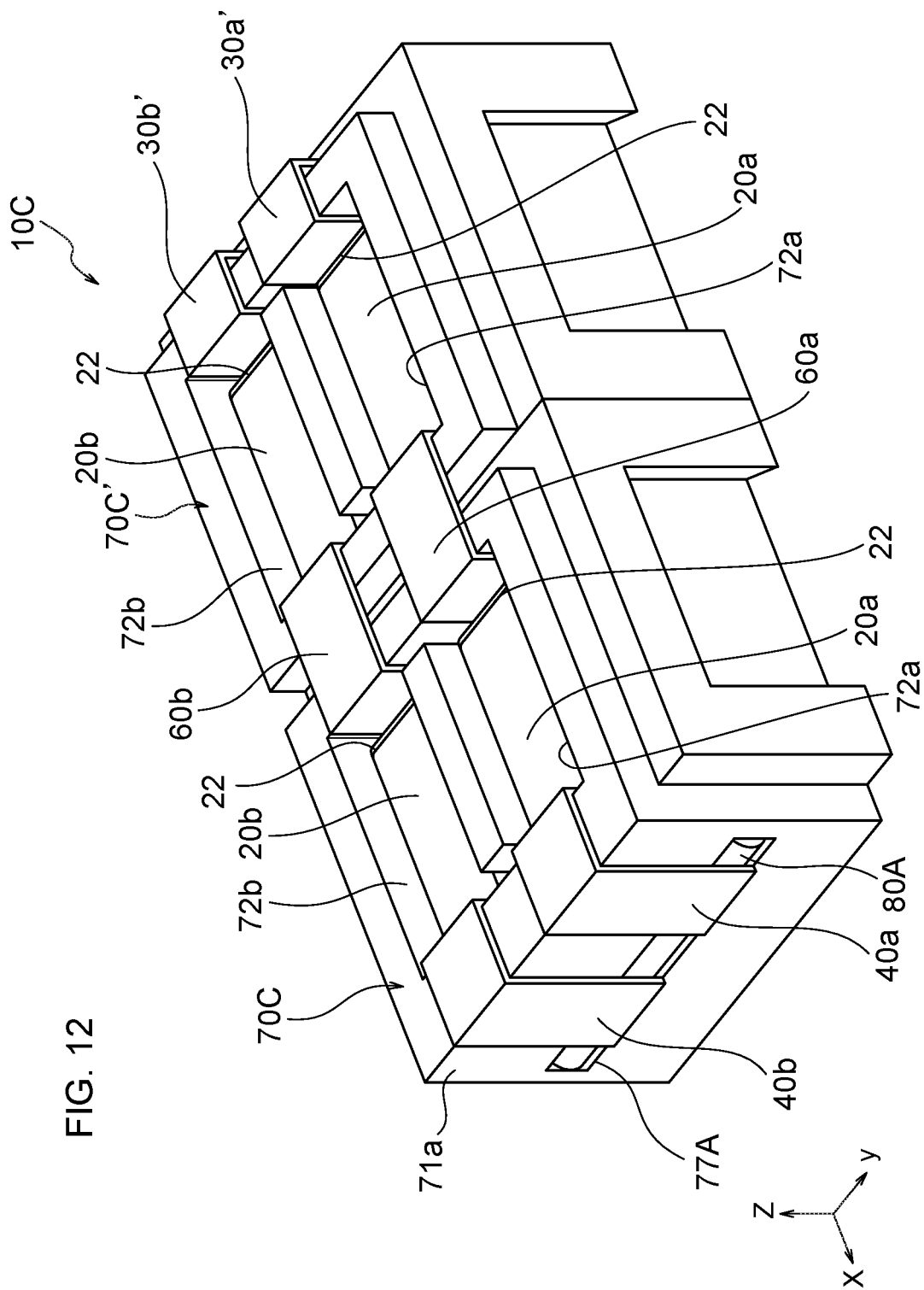
FIG. 12 is a perspective view of an electronic device according to Fourth Embodiment of the present invention.

Except for the following matters, an electronic device 10C according to Fourth Embodiment of the present invention has structure and effect similar to those of the electronic device 10A according to Second Embodiment. In FIG. 12 to FIG. 14, the common members with the electronic device 10A according to Second Embodiment are given the common references and are not partly explained.

As shown in FIG. 12, the electronic device 10C includes an insulation case 70C and an insulation case 70C'. The insulation case 70C and the insulation case 70C' are connected to each other.

Figure 13A:
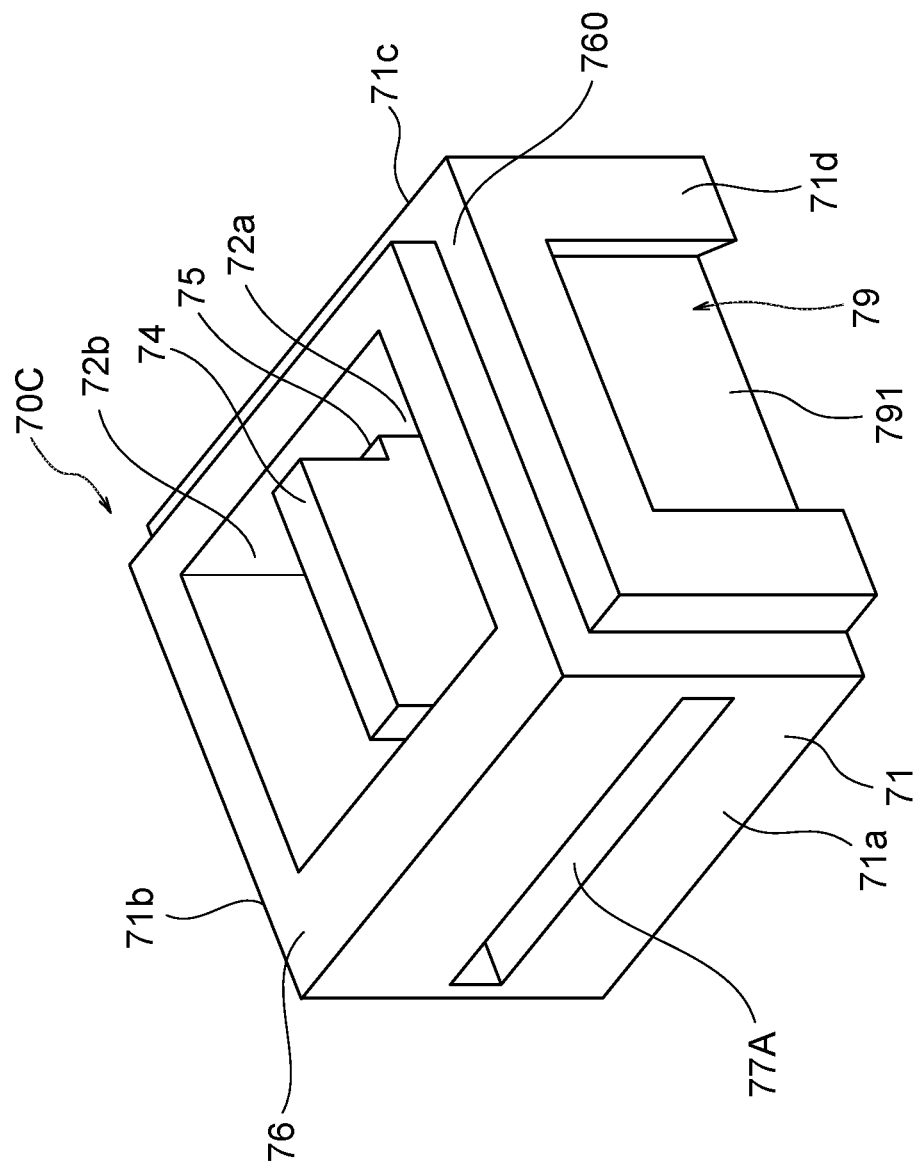
FIG. 13A is a perspective view of an insulation case 70C shown in FIG. 12.
Figure 13B:
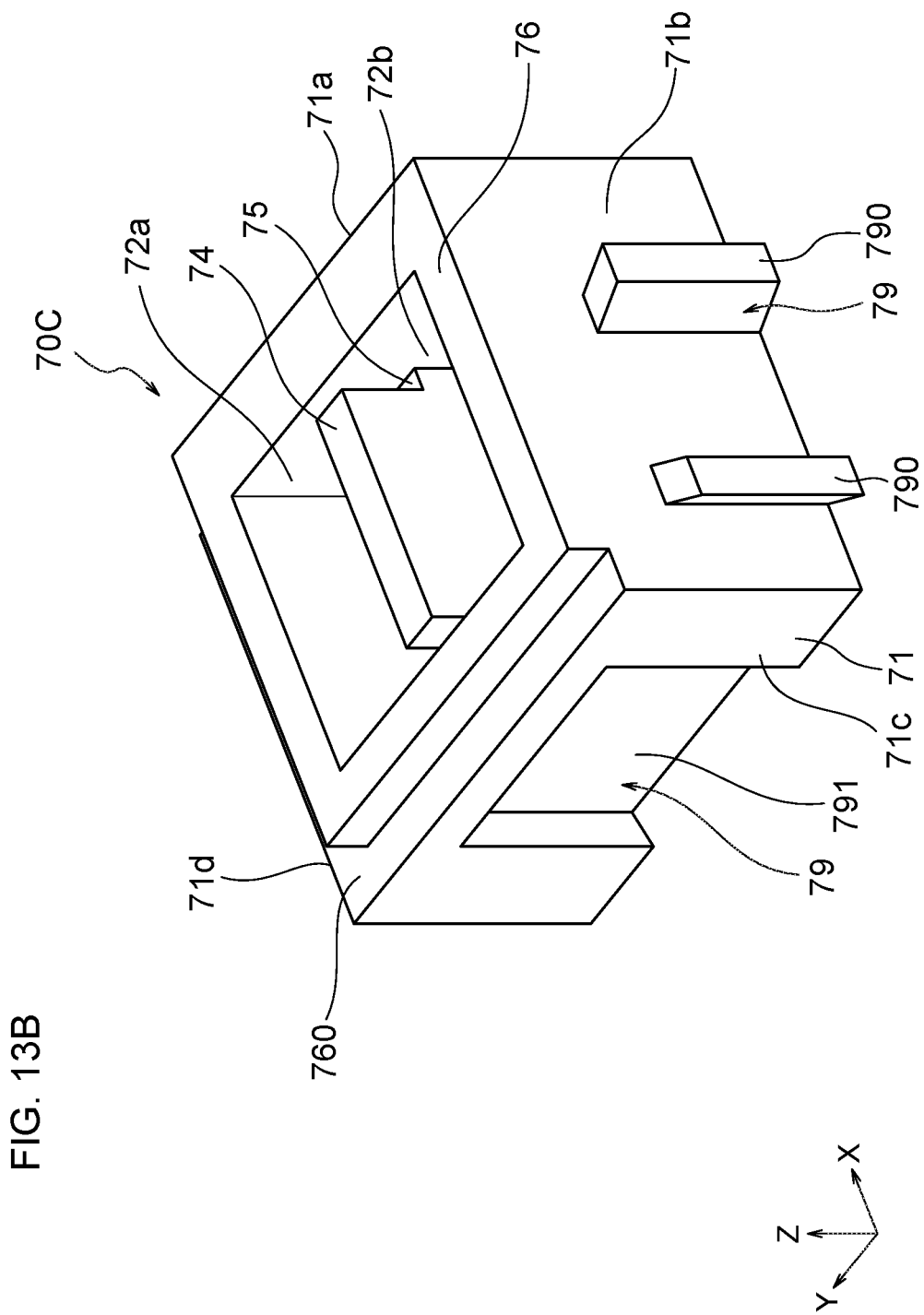
FIG. 13B is a perspective view of the case shown in FIG. 13A rotated by 180 degrees.
Figure 13C:
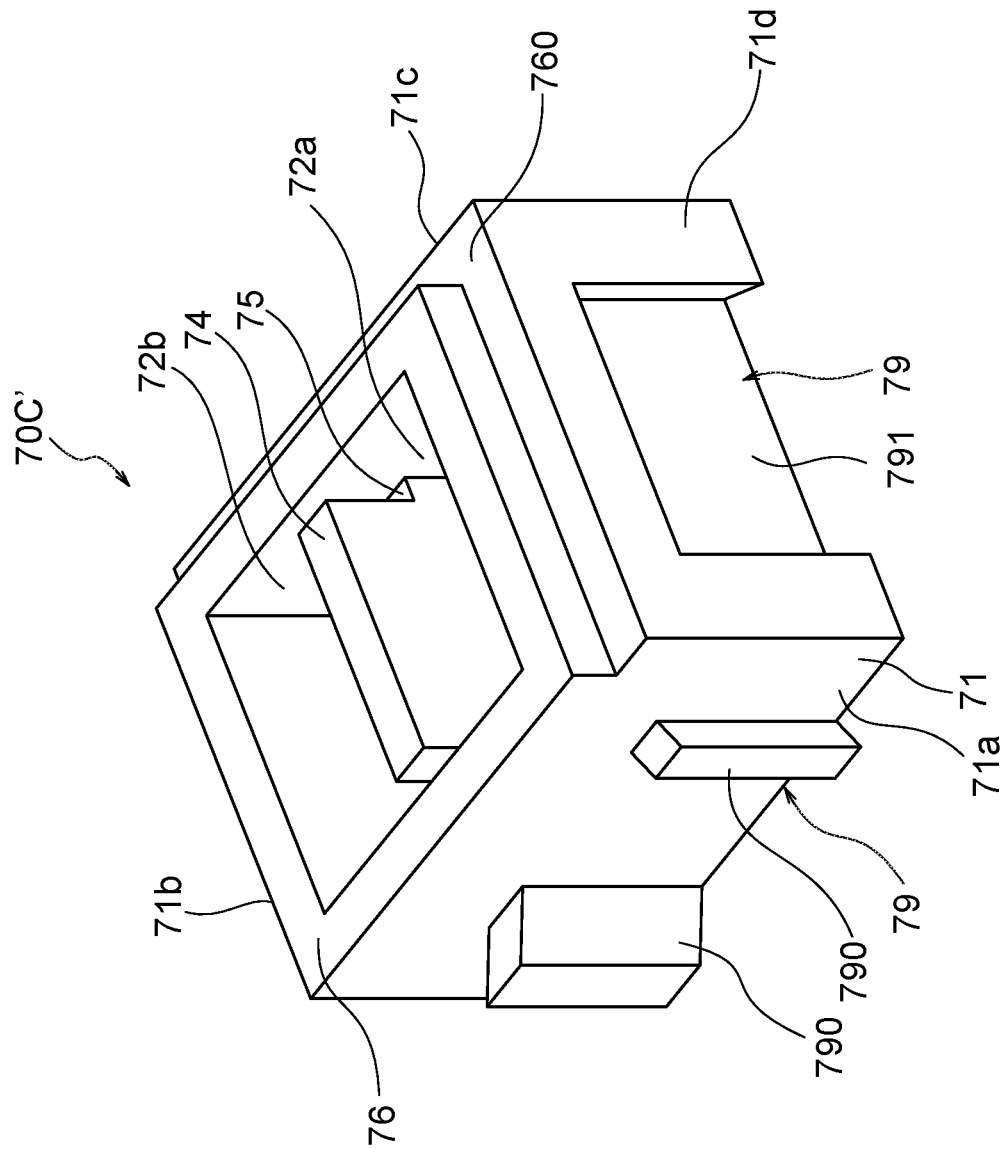
FIG. 13C is a perspective view of an insulation case 70C' shown in FIG. 12.
Figure 13D:
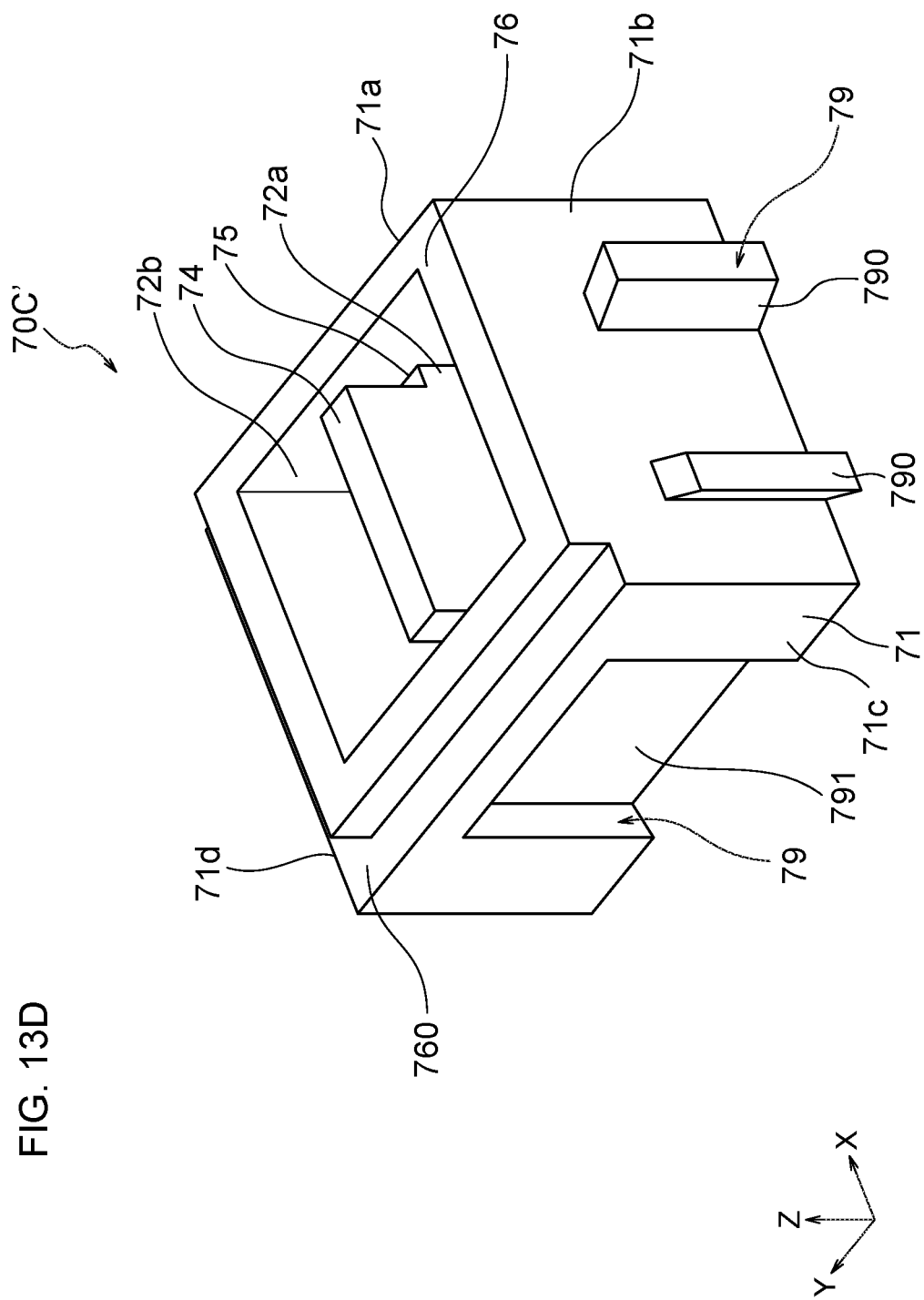
FIG. 13D is a perspective view of the case shown in FIG. 13C rotated by 180 degrees.

As shown in FIG. 13A and FIG. 13B, the insulation case 70C is different from the insulation case 70A according to Second Embodiment in that the insulation case 70C includes a step portion 760 formed on the open edge surface 76 and a joint portion 79, but does not include the terminal installation groove 78 (FIG. 5). The fuse hole 77A is formed alone on the side surface 71a of the insulation case 70C without being connected to the terminal installation groove 78. As shown in FIG. 13C and FIG. 13D, the insulation case 70C' is different from the insulation case 70C in that the insulation case 70C' does not include the fuse hole 77A.

In each of the insulation case 70C and the insulation case 70C', the step portion 760 is formed over the side surface 71c side and the side surface 71d side of the open edge surface 76 and is bent in substantially L shape manner.

In the insulation case 70C, as shown in FIG. 13A and FIG. 13B, the joint portion 79 is formed on each of the side surface 71b, the side surface 71c, and the side surface 71d of the outer wall 71. The joint portion 79 formed on each of the side surface 71c and the side surface 71d includes an engagement recess 791, and the joint portion 79 formed on the side surface 71b includes a pair of engagement protrusions 790 and 790.

The engagement recess 791 is recessed toward the inside of the insulation case 70C (in the thickness direction of the outer wall 71) at an approximately central part of each of the side surface 71c and the side surface 71d. The engagement recess 791 is formed so as to be wider toward the inside of the insulation case 70C (in the recess direction of the engagement recess 791) along the width direction (in the Y-axis direction or the X-axis direction). Thus, the engagement recess 791 has a trapezoidal cross-sectional shape when cut along a plane perpendicular to the Z-axis. In each of the side surface 71c and the side surface 71d, the engagement recess 791 extends from above an approximately central part in the Z-axis direction to the lower end in the Z-axis direction.

The pair of engagement protrusions 790 and 790 is formed with a predetermined interval in the X-axis direction and protrudes toward the outside of the insulation case 70C (the normal direction of the side surface 71b) on one side and the other side of the side surface 71b in the X-axis direction. Each of the engagement protrusions 790 and 790 is formed to have an approximately parallelogram cross-sectional shape when cut on a plane perpendicular to the extending direction of the engagement protrusions 790 and 790.

The engagement protrusions 790 and 790 extend so as to spread toward the outside of the insulation case 70C in the X-axis direction. That is, the engagement protrusions 790 formed on the side surface 71b do not extend straight in the Y-axis direction, but extend while being inclined to Y-axis with a predetermined inclination angle. The engagement protrusions 790 and 790 extend from above an approximately central part in the Z-axis direction to the lower end in the Z-axis direction on the side surface 71b.

In the insulation case 70C', as shown in FIG. 13C and FIG. 13D, the joint portions 79 are formed on the side surfaces 71a-71d of the outer wall 71. The joint portion 79 formed on each of the side surface 71a and the side surface 71b includes the pair of engagement protrusions 790 and 790, and the joint portion 79 formed on each of the side surface 71c and the side surface 71d includes the engagement recess 791.

The pair of engagement protrusions 790 and 790 formed on the side surface 71a of the insulation case 70C' shown in FIG. 13C and FIG. 13D engages with the engagement recess 791 formed on the side surface 71c of the insulation case 70C shown in FIG. 13A and FIG. 13B, and the insulation case 70C and the insulation case 70C' can be connected via the joint portion 79. Incidentally, the insulation case 70C and the insulation case 70C' engage with each other by sliding the upper ends of the pair of engagement protrusions 790 and 790 upward from the lower end of the engagement recess 791.

As shown in FIG. 14, a joint conductive terminal 60a includes a pair of inner electrode portions 62 and 62 and a connection portion 64 connecting the pair of inner electrode portions 62 and 62. Likewise, a joint conductive terminal 60b includes a pair of inner electrode portions 62 and 62 and a connection portion 64 connecting the pair of inner electrode portions 62 and 62.

Among the pair of inner electrode portions 62 and 62, one inner electrode portion 62 includes a curved portion 620. The pair of inner electrode portions 62 and 62 is integrally connected to one side and the other side of the connection portion 64 in its longitudinal direction (X-axis direction).

In the joint conductive terminal 60a, as shown in FIG. 12 and FIG. 14, one inner electrode portion 62 is inserted into the accommodation recess 72a of the insulation case 70C and is contacted and electrically connected to the first terminal electrode 22 of the capacitor chip 20a accommodated in the accommodation recess 72a, and the other inner electrode portion 62 is inserted into the accommodation recess 72a of the insulation case 70C' and is contacted and electrically connected to the second terminal electrode 24 of the capacitor chip 20a accommodated in the accommodation recess 72a. As a result, the capacitor chips 20a and 20a are connected in series via the joint conductive terminal 60a.

In the joint conductive terminal 60b, one inner electrode portion 62 is inserted into the accommodation recess 72b of the insulation case 70C and is contacted and electrically connected to the first terminal electrode 22 of the capacitor chip 20b accommodated in the accommodation recess 72b, and the other inner electrode portion 62 is inserted into the accommodation recess 72b of the insulation case 70C' and is contacted and electrically connected to the second terminal electrode 24 of the capacitor chip 20b accommodated in the accommodation recess 72b. As a result, the capacitor chips 20b and 20b are connected in series via the joint conductive terminal 60b.

The capacitor chips 20a and 20a connected in series via the joint conductive terminal 60a and the capacitor chips 20b and 20b connected in series via the joint conductive terminal 60b are connected in series via the fuse 80A. Thus, a series circuit consisting of four capacitor chips 20a, 20a, 20b, and 20b can be formed by mounting the first conductive terminals 30a' and 30b' located on the other side of the fuse 80A in the X-axis direction onto a circuit board or so.

In the present embodiment, in addition to the joint portions 79 arranged in the insulation cases 70C and 70C', the insulation cases 70C and 70C' are jointed via the joint conductive terminals 60a and 60b. A combined body of a plurality of electronic devices (electronic devices consisting of the insulation cases 70C and 70C') can be formed by jointing the insulation cases 70C and 70C' via the joint portions. Thus, in addition to being able to handle a plurality of electronic devices as a unit, the user can optimize the configuration to a user-friendly form by making arrangements, such as increasing or decreasing the number of jointed insulation cases according to the usage situation.

Incidentally, the present invention is not limited to the above-mentioned embodiments, but can variously be modified within the scope of the present invention.

In the above-mentioned embodiments, for example, the capacitor chips 20a and 20b are exemplified as the chip components, but the chip components may be ones excluding the capacitor chips 20a and 20b.

In First Embodiment, the number of capacitor chips included in the insulation case 70 is not limited to two and may be three or more or one. When the insulation case 70 includes three or more capacitor chips, the insulation case 70 includes three or more accommodation recesses. This is also the case with Second Embodiment to Fourth Embodiment.

In First Embodiment, the capacitor chips 20a and 20b are not necessarily accommodated in both of the accommodation recesses 72a and 72b, and either of the capacitor chips 20a and 20b may be accommodated in only either of the accommodation recesses 72a and 72b. This is also the case with Second Embodiment to Fourth Embodiment.

That is, it may be possible to constitute an electronic device 10 including: the capacitor chip 20a (capacitor chip 20b) including the terminal electrodes 22 and 24; the insulation case 70 including the accommodation recesses 72a and 72b for accommodating the capacitor chips 20a and 20b; the first conductive terminal 30a (first conductive terminal 30b) fixed to the insulation case 70 and connected to the first terminal electrode 22 or the second terminal electrode 24 of the capacitor chip 20a (capacitor chip 20b); and the fuse 80 electrically connected to the capacitor chip 20a (capacitor chip 20b).

In this constitution, when an overcurrent flows through the capacitor chip 20a (capacitor chip 20b) due to breakdown or so, the fuse 80 connected to the capacitor chip 20a (capacitor chip 20b) is electrically cut (fused), the electrical connection between the capacitor chip 20a (20b) and an electric circuit connected to the tip of the fuse 80 is released, and the overcurrent does not flow through this electric circuit. Thus, this electric circuit can be protected from damage, and a board or so can be prevented from being damaged due to heat generated by the overcurrent.

In First Embodiment, the position of the fuse hole 77 may be changed appropriately. In FIG. 1, for example, the fuse hole 77 may be formed between the first terminal electrodes 22 and 22 of the capacitor chips 20a and 20b.

In First Embodiment, the fuse 80 may be formed integrally with the insulation case 70.

In Second Embodiment, the communication grooves 75 and 75 may not be formed.

In Third Embodiment, the fuse 80B may be formed from a fuse having a chip shape. This is also the case with Second Embodiment and Fourth Embodiment.

In Third Embodiment, the fuse 80B is completely within the gap between the first conductive terminals 30a and 30b, but may partly protrude from this gap and may be disposed while overlapping with the first conductive terminals 30a and 30b.

DESCRIPTION OF THE REFERENCE NUMERICAL 10, 10A, 10B, 10C . . . electronic device
20a, 20b . . . capacitor chip
   21 . . . first end surface
   23 . . . second end surface
   22 . . . first terminal electrode
   24 . . . second terminal electrode
   26 . . . internal electrode layer
   28 . . . dielectric layer
30a, 30b, 30a', 30b', 40a, 40b . . . first conductive terminal, second conductive terminal
   32, 42 . . . inner electrode portion
     320 . . . curved portion
   34, 44 . . . open edge electrode portion
   36, 46 . . . side electrode portion
60 . . . joint conductive terminal
   62 . . . inner electrode portion
     620 . . . curved portion
   64 . . . connection portion
70, 70A, 70B, 70C, 70C' . . . insulation case
   71 . . . outer wall
     71a, 71b, 71c, 71d . . . side surface
   72a, 72b . . . accommodation recess
   73 . . . bottom wall
   74 . . . partition wall
   75 . . . communication groove
   76 . . . open edge surface
     760 . . . step portion
   77 . . . fuse hole
   78 . . . terminal installation groove
   79 . . . joint portion
     790 . . . engagement protrusion
     791 . . . engagement recess
80, 80A, 80B . . . fuse
   81, 82 . . . electrode

What is claimed is:

1. An electronic device comprising:
chip components each including a terminal electrode;
a case including accommodation recesses for accommodating the chip components;
conductive terminals fixed to the case and respectively connected to the terminal electrodes of the chip components; and
a fuse fixed to an outer side surface of an outer wall of the case surrounding the accommodation recesses and electrically connecting the chip components.

2. The electronic device according to claim 1, wherein the fuse connects the chip components via any of the conductive terminals.

3. The electronic device according to claim 1, wherein the case includes a fuse hole with a concave shape for accommodating the fuse.

4. The electronic device according to claim 3, wherein the fuse hole is formed on a side of the case and straddles regions each including one of the accommodation recesses and an other one of the accommodation recesses formed next to each other.

5. The electronic device according to claim 4, wherein the fuse has a bar shape.

6. The electronic device according to claim 4, wherein the fuse is pushed by an elastic force of any of the conductive terminals and is thereby fixed inside the fuse hole.

7. The electronic device according to claim 5, wherein the fuse is pushed by an elastic force of any of the conductive terminals and is thereby fixed inside the fuse hole.

8. The electronic device according to claim 1, wherein the fuse is fixed on a surface of the case.

9. The electronic device according to claim 8, wherein the fuse is at least partly disposed between the conductive terminals.

10. The electronic device according to claim 1, wherein the fuse has a chip shape.

11. The electronic device according to claim 1, further comprising a joint portion for jointing a plurality of the cases.

12. An electronic device comprising:
a chip component including a terminal electrode;

a case including a plurality of accommodation recesses for accommodating the chip component;

a conductive terminal fixed to the case and connected to the terminal electrode of the chip component; and a fuse fixed to an outer side surface of an outer wall of the case surrounding the accommodation recesses and electrically connected to the chip component.

13. An electronic device comprising;

chip components each including a terminal electrode;

a case including accommodation recesses for accommodating the chip components;

conductive terminals fixed to the case and respectively connected to the terminal electrodes of the chip components; and a fuse electrically connecting the chip components, wherein the case includes a fuse hole with a concave shape for accommodating the fuse, and the fuse hole is formed on an open edge surface around open surfaces of the accommodation recesses and straddles one of the accommodation recesses and an other one of the accommodation recesses next to each other.

14. An electronic device comprising;

chip components each including a terminal electrode;

a case including accommodation recesses for accommodating the chip components;

conductive terminals fixed to the case and respectively connected to the terminal electrodes of the chip components; and a fuse electrically connecting the chip components, wherein the case includes a fuse hole with a concave shape for accommodating the fuse, and the fuse hole is formed on a side of the case and straddles regions each including one of the accommodation recesses and an other one of the accommodation recesses formed next to each other.

15. The electronic device according to claim 14, wherein the fuse has a bar shape.

16. The electronic device according to claim 14, wherein the fuse is pushed by an elastic force of any of the conductive terminals and is thereby fixed inside the fuse hole.

17. The electronic device according to claim 15, wherein the fuse is pushed by an elastic force of any of the conductive terminals and is thereby fixed inside the fuse hole.

18. The electronic device according to claim 1, wherein the case includes a fuse hole with a concave shape for accommodating the fuse, the fuse hole being formed on the outer side surface of the outer wall.

19. An electronic device comprising;

chip components each including a terminal electrode;

a case including accommodation recesses for accommodating the chip components;

conductive terminals fixed to the case and respectively connected to the terminal electrodes of the chip components; and a fuse electrically connecting the chip components, wherein the fuse is accommodated in a recess formed on an open edge surface of an outer wall of the case surrounding the accommodation recesses.

20. The electronic device according to claim 19, wherein the fuse directly connects the chip components.

21. An electronic device comprising:

a chip component including a terminal electrode;

a case including a plurality of accommodation recesses for accommodating the chip component;

a conductive terminal fixed to the case and connected to the terminal electrode of the chip component; and a fuse accommodated in a recess formed on an open edge surface of an outer wall of the case surrounding the accommodation recesses and electrically connected to the chip component.

22. An electronic device comprising:

chip components each including a terminal electrode;

cases each including accommodation recesses for accommodating the chip components;

conductive terminals fixed to the cases and respectively connected to the terminal electrodes of the chip components;

a fuse electrically connecting the chip components; and a joint portion for joining the cases.

23. An electronic device comprising;

chip components each including a terminal electrode;

a case including a bottom wall opposite an opening, an outer wall extending upwardly from an outer edge of the bottom wall in a direction perpendicular to the bottom wall, and accommodation recesses for accommodating the chip components;

conductive terminals fixed to the case and respectively connected to the terminal electrodes of the chip components; and a fuse electrically connecting the chip components, wherein the fuse is embedded within a surface portion of the outer wall of the case, and the outer wall surrounds the accommodation recesses and defines an outer edge of the case.

24. An electronic device comprising:

a chip component including a terminal electrode;

a case including a bottom wall opposite an opening, an outer wall extending upwardly from an outer edge of the bottom wall in a direction perpendicular to the bottom wall, and a plurality of accommodation recesses for accommodating the chip component;

a conductive terminal fixed to the case and connected to the terminal electrode of the chip component; and a fuse electrically connected to the chip component, wherein the fuse is embedded within a surface portion of the outer wall of the case, and the outer wall surrounds the accommodation recesses and defines an outer edge of the case.

* * * * *